United States Patent
Lim et al.

(10) Patent No.: US 12,113,977 B2
(45) Date of Patent: Oct. 8, 2024

(54) METHOD AND APPARATUS FOR ENCODING/DECODING IMAGE BY USING BOUNDARY PROCESSING, AND RECORDING MEDIUM FOR STORING BITSTREAM

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/317,785

(22) Filed: May 15, 2023

(65) Prior Publication Data
US 2023/0308647 A1 Sep. 28, 2023

Related U.S. Application Data

(63) Continuation of application No. 17/277,512, filed as application No. PCT/KR2019/012171 on Sep. 19, 2019, now Pat. No. 11,689,720.

(30) Foreign Application Priority Data

Sep. 19, 2018 (KR) .................. 10-2018-0112077

(51) Int. Cl.
*H04N 19/119* (2014.01)
*H04N 19/176* (2014.01)
*H04N 19/96* (2014.01)

(52) U.S. Cl.
CPC ......... *H04N 19/119* (2014.11); *H04N 19/176* (2014.11); *H04N 19/96* (2014.11)

(58) Field of Classification Search
CPC .... H04N 19/119; H04N 19/176; H04N 19/96; H04N 19/157; H04N 19/136;
(Continued)

(56) References Cited

U.S. PATENT DOCUMENTS

2017/0208336 A1   7/2017  Li et al.
2020/0213590 A1*  7/2020  Kim .................. H04N 19/129

FOREIGN PATENT DOCUMENTS

CN   102640492 A    8/2012
KR   100772576 B1  11/2007
(Continued)

OTHER PUBLICATIONS

Han Gao et al., CE1-2.0.11: Picture Boundary Handling, Joint Video Experts Team (JVET) of ITU-T SG 16 WP 3 and ISO/IEC JTC 1/SC 29/WG 11, JVET-K0287-v1, 11th Meeting: Ljubljana, SI, Jul. 10-18, 2018, Huawei Technologies Co.,Ltd.
(Continued)

*Primary Examiner* — Nam D Pham
(74) *Attorney, Agent, or Firm* — BROADVIEW IP LAW, PC

(57) ABSTRACT

There is provided a method and apparatus of encoding/decoding an image. The method comprises decoding information on block partitioning of a current block included in a current picture from a bitstream; determining a partitioning method of the current block on the basis of the information; and partitioning the current block by using the determined partitioning method, wherein the partitioning method is determined on the basis of whether or not the current block includes a predetermined boundary.

12 Claims, 10 Drawing Sheets (a)

(b)

(c)

(d)

(58) Field of Classification Search
CPC .. H04N 19/124; H04N 19/184; H04N 19/503; H04N 19/593; H04N 19/60
See application file for complete search history.

(56) References Cited

FOREIGN PATENT DOCUMENTS

| | | |
|---|---|---|
| KR | 1020170128389 A | 11/2017 |
| WO | 2001086962 A1 | 11/2001 |
| WO | 2016148438 A2 | 9/2016 |
| WO | 2017030260 A1 | 2/2017 |
| WO | 2018/070550 A1 | 4/2018 |

OTHER PUBLICATIONS

Jackie Ma et al., Description of Core Experiment: Partitioning, Joint Video Exploration Team (JVET) of ITU-T SG 16 WP 3 and ISO/IEC JTC 1/SC 29/WG 11, JVET-J1021-r5, 10th Meeting: San Diego, US, Apr. 10-20, 2018, CE coordinators.

* cited by examiner

METHOD AND APPARATUS FOR ENCODING/DECODING IMAGE BY USING BOUNDARY PROCESSING, AND RECORDING MEDIUM FOR STORING BITSTREAM

CROSS-REFERENCE TO RELATED APPLICATIONS

The present application is a continuation application of U.S. application Ser. No. 17/277,512, filed on Mar. 18, 2021, which was the National Stage of International Application No. PCT/KR2019/012171 filed on Sep. 19, 2019, which claims priority to Korean Patent Application No. KR10-2018-0112077, filed on Sep. 19, 2018, with the Korean Intellectual Property Office, which are incorporated herein by reference in their entirety.

TECHNICAL FIELD

The present invention relates to a method and apparatus for encoding/decoding an image, and a recording medium storing a bitstream. More particularly, the present invention relates to a method and apparatus for encoding/decoding an image on the basis of a block structure, and a recording medium storing a bitstream.

BACKGROUND ART

Recently, demands for high-resolution and high-quality videos, such as high-definition (HD) and ultrahigh-definition (UHD) videos, have increased in various fields of applications. As video data has higher resolution and higher quality, the amount of data increases more relative to existing video data. Accordingly, when video data is transferred using media such as existing wired and wireless broadband lines or is stored in existing storage media, transfer cost and storage cost increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In conventional image encoding/decoding, only a block structure in a quad-tree form is used and thus there are limitations to enhance encoding efficiency.

DISCLOSURE

Technical Problem

An objective of the present invention is to provide an image encoding/decoding method and apparatus for improving image encoding/decoding efficiency.

In addition, another objective of the present invention is to provide a method and apparatus using a block shape with various aspect ratios, or efficiently performing block partitioning on a boundary of a picture/sub-picture/slice/tile/brick, etc. so as to improve image encoding/decoding efficiency.

In addition, still another objective of the present invention is to provide a recording medium storing a bitstream generated by an image encoding/decoding method and apparatus of the present invention.

Technical Solution

According to the present invention, there is provided a method of decoding an image, the method comprising: decoding information on block partitioning of a current block included in a current picture from a bitstream; determining a partitioning method of the current block on the basis of the information; and partitioning the current block by using the determined partitioning method, wherein the partitioning method is determined on the basis of whether or not the current block includes a predetermined boundary.

According to one embodiment, the information on block partitioning includes at least one of information on a size of the current block, information on a depth of the current block, and information on whether or not to perform partitioning.

According to one embodiment, the partitioning method includes at least one of quad-tree partitioning, horizontal binary-tree partitioning, vertical binary-tree partitioning, horizontal ternary-tree partitioning, and vertical ternary-tree partitioning.

According to one embodiment, the predetermined boundary includes at least one of a right boundary, a lower boundary, a left boundary, and an upper boundary of at least one of a picture, a sub-picture, a slice, a tile, and a brick to which the current block belongs.

According to one embodiment, when the current block includes a right boundary and a lower boundary of the current picture, and a width of the current block is greater than a size of a smallest quad-tree block, the partitioning method is determined as quad-tree partitioning.

According to one embodiment, when the current block includes a right boundary of the current picture, and a height of the current block is greater than a size of a largest transform block, the partitioning method is determined as partitioning other than vertical binary-tree partitioning.

According to one embodiment, when the current block includes a lower boundary of the current picture, and a width of the current block is greater than a size of a largest transform block, the partitioning method is determined as partitioning other than horizontal binary-tree partitioning.

According to one embodiment, when a width of the current block is equal to or smaller than a size of a largest transform block, and a height of the current block is greater than the size of the largest transform block, the partitioning method is determined as partitioning other than vertical binary-tree partitioning.

According to one embodiment, when a height of the current block is equal to or smaller than a size of a largest transform block, and a width of the current block is greater than the size of the largest transform block, the partitioning method is determined as partitioning other than horizontal binary-tree partitioning.

According to one embodiment, the size of the largest transform block may be a value signaled from an encoder to a decoder.

Also, according to the present invention, there is provided a method of encoding an image, the method comprising:

determining a partitioning method of a current block included in a current picture; partitioning the current block by using the determined partitioning method; and encoding information on block partitioning of the partitioning method, wherein the partitioning method is determined on the basis of whether or not the current block includes a predetermined boundary.

According to one embodiment, the information on block partitioning includes at least one of information on a size of the current block, information on a depth of the current block, and information on whether or not to perform partitioning.

According to one embodiment, the partitioning method includes at least one of quad-tree partitioning, horizontal binary-tree partitioning, vertical binary-tree partitioning, horizontal ternary-tree partitioning, and vertical ternary-tree partitioning.

According to one embodiment, the predetermined boundary includes at least one of a right boundary, a lower boundary, a left boundary, and an upper boundary of at least one of a picture, a sub-picture, a slice, a tile, and a brick to which the current block belongs.

According to one embodiment, when the current block includes a right boundary and a lower boundary of the current picture, and a width of the current block is greater than a size of a smallest quad-tree block, the partitioning method is determined as quad-tree partitioning.

According to one embodiment, when the current block includes a right boundary of the current picture, and a height of the current block is greater than a size of a largest transform block, the partitioning method is determined as partitioning other than vertical binary-tree partitioning.

According to one embodiment, when the current block includes a lower boundary of the current picture, and a width of the current block is greater than a size of a largest transform block, the partitioning method is determined as partitioning other than horizontal binary-tree partitioning.

According to one embodiment, when a width of the current block is equal to or smaller than a size of a largest transform block, and a height of the current block is greater than the size of the largest transform block, the partitioning method is determined as partitioning other than vertical binary-tree partitioning.

According to one embodiment, when a height of the current block is equal to or smaller than a size of a largest transform block, and a width of the current block is greater than the size of the largest transform block, the partitioning method is determined as partitioning other than horizontal binary-tree partitioning.

According to one embodiment, the size of the largest transform block may be a value signaled from an encoder to a decoder.

Also, according to the present invention, there is provided a computer readable non-volatile recording medium storing image data used for an image decoding method, wherein the image data includes information on block partitioning of a current block included in a current picture, and in the image decoding method, the information on block partitioning is used for determining a partitioning method of the current block, the determined partitioning method is used for partitioning the current block, and the partitioning method is determined on the basis of whether or not the current block includes a predetermined boundary.

Advantageous Effects

In order to improve image encoding/decoding efficiency, there is provided a method and apparatus performing at least one of using a block shape with various aspect ratios, and efficiently performing block partitioning on a boundary of a picture/sub-picture/slice/tile/brick, etc., and a recording medium storing a bitstream.

According to the present invention, there is provided an image encoding/decoding method and apparatus for improving image encoding/decoding efficiency.

In addition, according to the present invention, there is provided a method and apparatus using a block shape with various aspect ratios, or efficiently performing block partitioning on a boundary of a picture/sub-picture/slice/tile/brick, etc. so as to improve image encoding/decoding efficiency.

In addition, according to the present invention, there is provided a recording medium storing a bitstream generated by an image encoding/decoding method and apparatus of the present invention.

MODE FOR INVENTION

Figure 1:
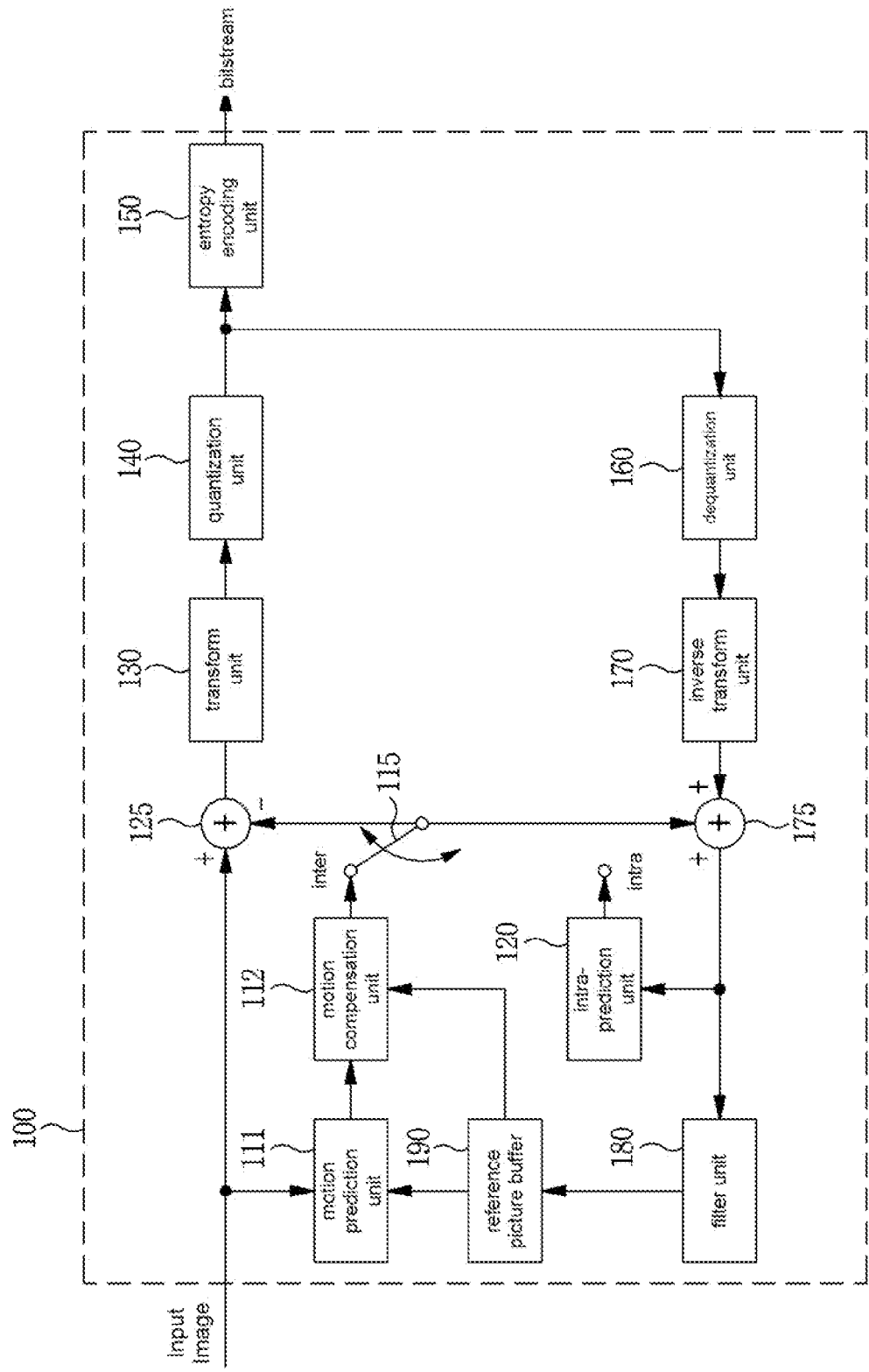
FIG. 1 is a block diagram showing a configuration of an embodiment of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd-1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

The adaptation parameter set refers to a parameter set that can be shared and referred to by different pictures, sub-pictures, slices, tile groups, tiles, or bricks. In addition, sub-pictures, slices, tile groups, tiles, or bricks in a picture may refer to different adaptation parameter sets to use information in the different adaptation parameter sets.

Regarding the adaptation parameter sets, sub-pictures, slices, tile groups, tiles, or bricks in a picture may refer to different adaptation parameter sets by using identifiers of the respective adaptation parameter sets.

Regarding the adaptation parameter sets, slices, tile groups, tiles, or bricks in a sub-picture may refer to different adaptation parameter sets by using identifiers of the respective adaptation parameter sets.

Regarding the adaptation parameter sets, tiles or bricks in a slice may refer to different adaptation parameter sets by using identifiers of the respective adaptation parameter sets.

Regarding the adaptation parameter sets, bricks in a tile may refer to different adaptation parameter sets by using identifiers of the respective adaptation parameter sets.

The parameter set or header of a sub-picture may include information on an adaptation parameter set identifier. Thus, an adaptation parameter set corresponding to the adaptation parameter set identifier may be used in the sub-picture.

The parameter set or header of a tile may include an adaption parameter set identifier so that an adaption parameter set corresponding to the adaption parameter set identifier may be used in the tile.

The header of a brick may include information on an adaptation parameter set identifier so that an adaptation parameter set corresponding to the adaptation parameter set identifier may be used in the brick.

The picture may be partitioned into one or more tile rows and one or more tile columns.

The sub-picture may be partitioned into one or more tile rows and one or more tile columns within a picture. The sub-picture may be a region having the form of a rectangle/square within a picture and may include one or more CTUs. In addition, at least one or more tiles/bricks/slices may be included within one sub-picture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. The A tile that cannot be partitioned into two or more bricks may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type tree partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
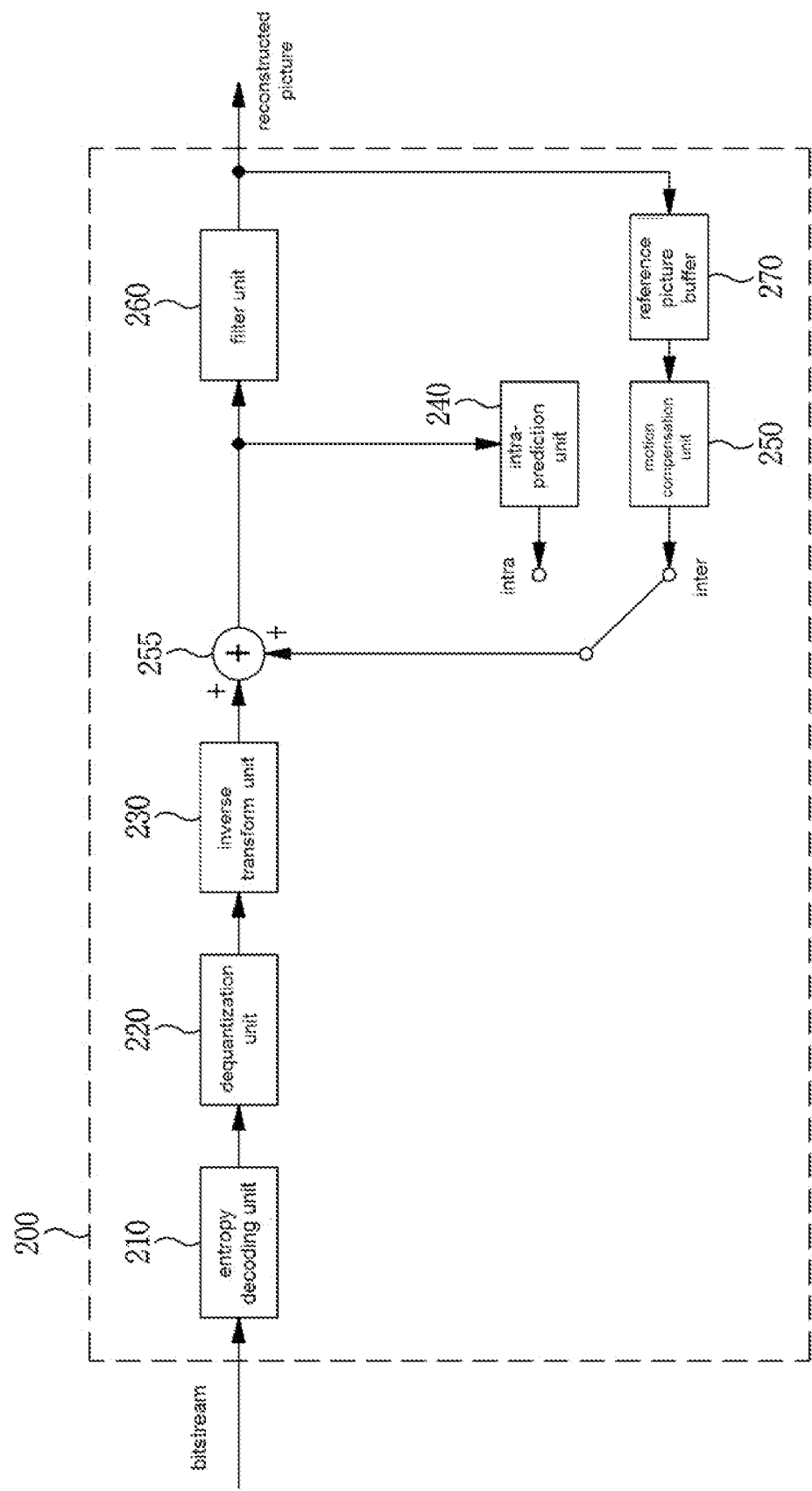
FIG. 2 is a block diagram of an embodiment of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
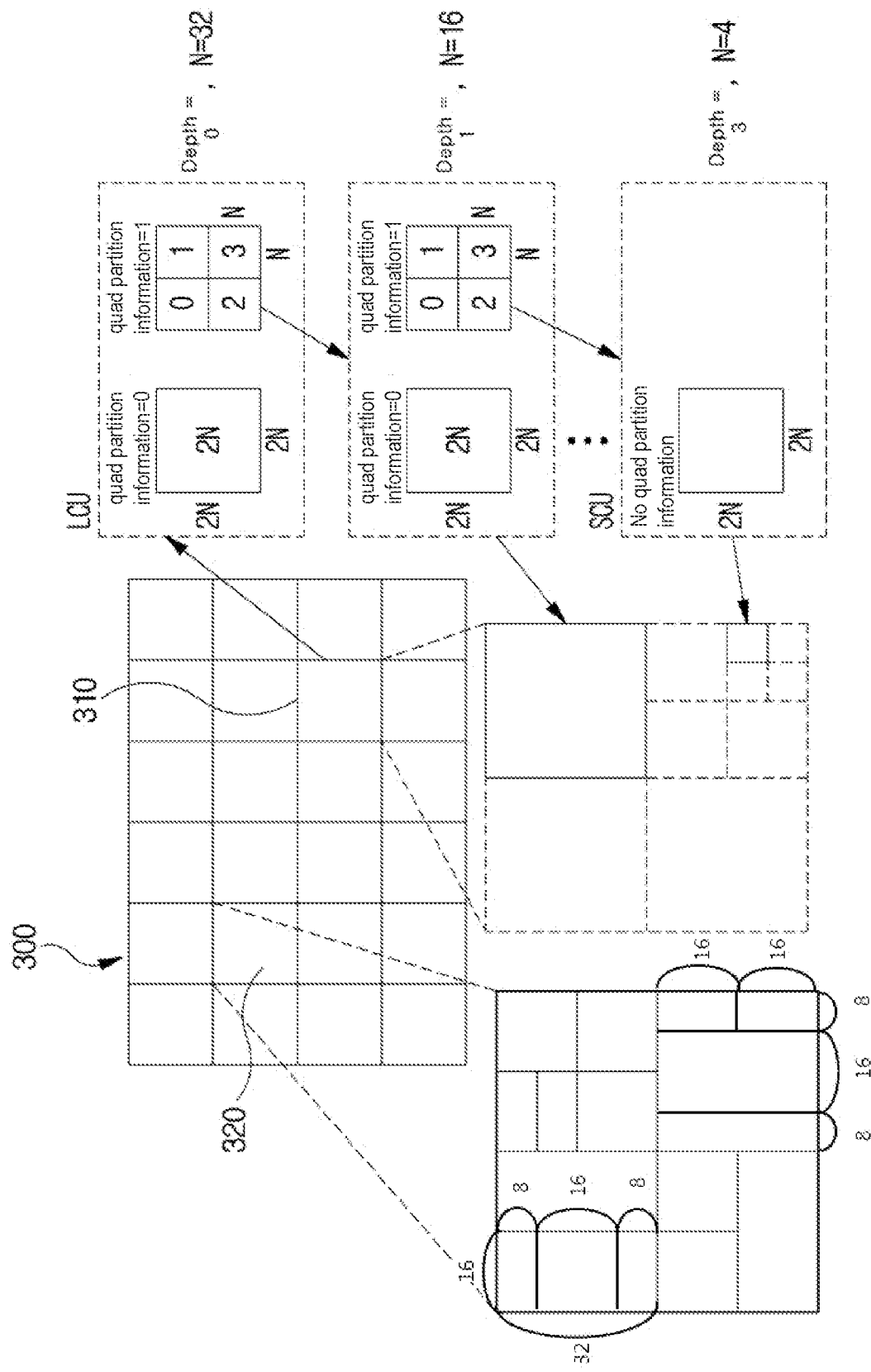
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned For example, a CTU may have a size where a height and a width are identical such as 64×64, 128×128, 256×256, 512×512, etc. Herein, a height or width of a CTU may be at least one of a positive integer that is a multiple of two, four or eight. In addition, for example, a CTU may have a size where a height and a width are different from each other such as 128×64, 64×128, 256×64, 64×256, 512×64, 64×512, 256×128, 128×256, etc. Similarly, herein, a height or width of a CTU may be at least one of a positive integer that is a multiple of two, four or eight.

For example, a CU may be a size where a height and a width are identical such as 4×4, 8×8, 16×16, 32×32, 64×64, 128×128, 256×256, 512×512, etc. Herein, a height or width of a CU may be at least one of a positive integer that is a multiple of two, four or eight. In addition, for example, a CU may have a size where a height and a width are different from each other such as 4×8, 8×4, 4×16, 16×4, 4×32, 32×4, 4×64, 64×4, 8×16, 16×8, 8×32, 32×8, 8×64, 64×8, 16×32, 32×16, 16×64, 64×16, 16×128, 128×16, 32×64, 64×32, 32×128, 128×32, 128×64, 64×128, 256×64, 64×256, 512× 64, 64×512, 256×128, 128×256, etc. Similarly, herein, a height or width of a CU may be at least one of a positive integer that is a multiple of two, four or eight.

For example, a SCU may have a size where a height and a width are identical such as 2×2, 4×4, 8×8, 16×16, 32×32, 64×64, 64×64, 128×128, 256×256, 512×512, etc. Herein, a height or width of a CTU may be at least one of a positive integer that is a multiple of two, four or eight. In addition, for example, a CTU may have a size where a height and a width are different from each other such as 2×4, 4×2, 2×8, 8×2, 2×16, 16×2, 2×32, 32×2, 4×8, 8×4, 4×16, 16×4, 4×32, 32×4, 4×64, 64×4, 8×16, 16×8, 8×32, 32×8, 8×64, 64×8, 16×32, 32×16, 16×64, 64×16, 16×128, 128×16, 32×64, 64×32, 32×128, 128×32, 128×64, 64×128, 256×64, 64×256, 512×64, 64×512, 256×128, 128×256, etc. Similarly, herein, a height or width of a CTU may be at least one of a positive integer that is a multiple of two, four or eight.

At least one of the CTU, the CU, the SCU, and the sub-CU may have a ratio of a width to a height or a ratio of a height to a width is at least one of N:N, 1.5×N:N, 2×N:N, 2.5×N:N, 3×N:N, 3.5×N:N, 4×N:N, 4.5×N:N, 5×N:N, 5.5× N:N, 6×N:N, N:1.5×N, N:2×N, N:2.5×N, N:3×N, N:3.5×N, N:4×N, N:4.5×N, N:5×N, N:5.5×N, and N:6×N. Herein, N may be a positive integer of 2, 4, 6, 8, etc. In addition, herein, a sub-CU may mean a unit obtained by partitioning a CU at least one time when encoding/decoding the CU rather than obtained from a block partitioning structure.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit (CU) is partitioned into two sub-CUs, the two sub-CUs may respectively have widths or heights being of a ratio of 1/K: (K−1)/K or (K−1)/K: 1/K compared to a width or height of the CU. Herein, K may be a positive integer of 2, 3, 4, 5, 6, 7, 8, 16, 32, etc.

In an example, when CU having a size of 32×32 is vertically partitioned into two sub-CUs having a ratio of 1:3, the two sub-CUs may respectively have sizes of 8×32 and 24×32.

In another example, when a CU having a size of 8×32 is horizontally partitioned into two sub-CUs having a ratio of 1:3, the two sub-CUs may respectively have sizes 8×8 and 8×24.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

For example, when one CU is partitioned into three sub-CUs, the three sub-CUs may be obtained by partitioning a width or height of the CU according to a ratio of K:L:M such as 1:2:1, 2:1:1, 1:1:2, 1:4:1, 4:1:1, 1:1:4, 1:3:2, 2:3:1, 1:6:1, 6:1:1, 1:1:6, 1:5:2, 2:5:1, etc. Herein, K, L, and M may be a positive integer.

In an example, when a CU having a size of 16×32 is horizontally partitioned into three sub-CUs having a ratio of 1:6:1, the three sub-CUs may respectively have sizes of 16×4, 16×24, and 16×4 from the upper.

In another example, a CU having a size of 32×32 is vertically partitioned into three sub-CUs having a ratio of 6:1:1, the three sub-CUs may respectively have sizes of 24×32, 4×32, and 4×32 from the left.

For example, when a size of a CU is not the multiple of the sum of K, L, and M (that is, K+L+M), the CU may be partitioned according to a preset rule. In an example, when M has the largest value in K: L: M, a positive integer of n may be added to M such that a size of a CU becomes the multiple of (K+L+M+n). In other words, a CU may be partitioned according to a ratio of K:L:(M+n).

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

For example, binary-tree partitioning may be preferentially applied to a CTU. A CU on which binary-tree partitioning cannot be performed further may correspond to a leaf node of a binary-tree. A CU corresponding to a leaf node of a binary-tree may become a root node of a quad-tree and/or a ternary tree. In other words, a CU corresponding to a leaf node of a binary-tree may be partitioned according to a quad-tree or a ternary tree, or may not be partitioned further. Herein, binary-tree partitioning is not performed further on a CU generated by performing quad-tree partitioning or ternary-tree partitioning on a CU corresponding to a leaf node of a binary-tree, and thus block partitioning and/or signaling of partitioning information can be effectively performed.

For example, ternary-tree partitioning may be preferentially applied to a CTU. A CU on which ternary-tree partitioning cannot be performed further may corresponds to a leaf node of a ternary-tree. A CU corresponding to a leaf node of a ternary-tree may become a root node of a quad-tree and/or a binary-tree. In other words, a CU corresponding to a leaf node of a ternary-tree may be partitioned according to a quad-tree or a binary-tree, or may not be partitioned further. Herein, ternary-tree partitioning is not performed further on a CU generated by performing quad-tree partitioning or binary-tree partitioning on a CU corresponding to a leaf node of a ternary-tree, and thus block partitioning and/or signaling of partitioning information can be effectively performed.

For example, for a CTU, quad-tree partitioning, ternary-tree partitioning, binary-tree partitioning may be sequentially applied.

For example, for a CTU, ternary-tree partitioning, binary-tree partitioning, quad-tree partitioning may be sequentially applied.

For example, for a CTU, among quad-tree partitioning, binary-tree partitioning, and ternary-tree partitioning, partitioning where a height or width is partitioned according to a symmetric ratio may be performed, and then partitioning according to an asymmetric ratio may be performed.

For example, when binary-tree partitioning is performed on a CTU, partitioning priorities may vary according to whether a symmetric ratio or an asymmetric ratio is applied to a height or width.

For example, when ternary-tree partitioning is performed on a CTU, partitioning priorities may vary according to whether a symmetric ratio or an asymmetric ratio is applied to a height or width, or according to whether a symmetric ratio or an asymmetric ratio is applied to at least two sub-CTUs of the three sub-CTUs.

The fact that a coding unit corresponding to a node of a quad tree is partitioned may be signaled using quad-tree partition information. The quad-tree partition information having a first value (e.g., "1") may indicate that a current coding unit is partitioned by the quad tree partition structure. The quad-tree partition information having a second value (e.g., "0") may indicate that a current coding unit is not partitioned by the quad tree partition structure. The quad-tree partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

Partitioning priorities may not be present between quad-tree partitioning and ternary-tree partitioning. In other words, quad-tree partitioning or ternary-tree partitioning may be performed on a CU corresponding to a leaf node of a binary-tree. In addition, a CU generated by quad-tree partitioning or ternary-tree partitioning may be partitioned again on the basis of a quad-tree or a ternary-tree, or may not be partitioned further.

Partitioning priorities may not be present between quad-tree partitioning and binary-tree partitioning. In other words, quad-tree partitioning or binary-tree partitioning may be performed on a CU corresponding to a leaf node of a ternary-tree. In addition, a CU generated by quad-tree partitioning or binary-tree partitioning may be partitioned again on the basis of a quad-tree or a binary-tree, or may not be partitioned further.

In case of binary-tree partitioning or ternary-tree partitioning, partitioning priorities may not be present between partitioning trees according to whether a symmetric ratio or an asymmetric ratio is applied to a height or width.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

A signaling order may be a value preset in the encoder/decoder, or may be a value signaled from the encoder to the decoder.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

Partitioning on a CU corresponding to each node of a multi-type tree may be signaled by using at least one of information on whether or not to perform multi-type tree partitioning, information on a partitioning direction, information on a partitioning ratio, and information on a partitioning tree. In order to perform partitioning on a CU corresponding to each node of a multi-type tree, information on whether or not to perform partitioning, information on a partitioning direction, information on a partitioning ratio, and information on a partitioning tree may be sequentially signaled.

In addition, in order to perform partitioning on a CU corresponding to each node of a multi-type tree, information on whether or not to perform partitioning, information on a partitioning direction, information on a partitioning tree, and information on a partitioning ratio may be sequentially signaled.

In addition, in order to perform partitioning on a CU corresponding to each node of a multi-type tree, information on whether or not to perform partitioning, information on a partitioning ratio, information on a partitioning direction, and information on a partitioning tree may be sequentially signaled.

When partitioning on a CU corresponding to each node of a multi-type tree is performed, the CU may further include information on a partitioning ratio. Information on a partitioning may indicate a ratio used for performing multi-type tree partitioning.

In below, an example is shown where a partitioning ratio indicates information on a partitioning ratio when performing binary-tree partitioning.

In an example, information on a partitioning ratio having a first value may indicate that a width or height of a corresponding CU is partitioned on the basis of a binary-tree according to a ratio of 1:1.

In another example, information on a partitioning ratio having a second value may indicate that a width or height of a corresponding CU is partitioned on the basis of a binary-tree according to a ratio of 1:3.

In another example, information on a partitioning ratio having a third value may indicate that a width or height of a corresponding CU is partitioned on the basis of a binary-tree according to a ratio of 1:7.

In another example, information on a partitioning ratio having a fourth value may indicate that a width or height of a corresponding CU is partitioned on the basis of a binary-tree according to a ratio of 1:15.

In below, an example is shown where a partitioning ratio indicates information on a partitioning ratio when performing binary-tree partitioning.

In an example, information on a partitioning ratio having a first value may indicate that a width or height of a corresponding CU is partitioned on the basis of a binary-tree according to a ratio of 1:1.

In another example, information on a partitioning ratio having a second value may indicate that a width or height of a corresponding CU is partitioned on the basis of a binary-tree according to a ratio of 3:1.

In another example, information on a partitioning ratio having a third value may indicate that a width or height of a corresponding CU is partitioned on the basis of a binary-tree according to a ratio of 1:3.

In below, an example is shown where a partitioning ratio indicates information on a partitioning ratio when performing ternary-tree partitioning.

In an example, information on a partitioning ratio having a first value may indicate that a width or height of a corresponding CU is partitioned on the basis of a ternary-tree according to a ratio of 1:2:1.

In another example, information on a partitioning ratio having a second value may indicate that a width or height of a corresponding CU is partitioned on the basis of a ternary-tree according to a ratio of 1:4:1.

In an example, information on a partitioning ratio having a third value may indicate that a width or height of a corresponding CU is partitioned on the basis of a ternary-tree according to a ratio of 1:6:1.

In another example, information on a partitioning ratio having a third value may indicate that a width or height of a corresponding CU is partitioned on the basis of a ternary-tree according to a ratio of 1:8:1.

In below, an example is shown where a partitioning ratio indicates information on a partitioning ratio when performing ternary-tree partitioning.

In an example, information on a partitioning ratio having a first value may indicate that a width or height of a corresponding CU is partitioned on the basis of a ternary-tree according to a ratio of 1:2:1.

In another example, information on a partitioning ratio having a second value may indicate that a width or height of a corresponding CU is partitioned on the basis of a ternary-tree according to a ratio of 2:1:1.

In an example, information on a partitioning ratio having a third value may indicate that a width or height of a corresponding CU is partitioned on the basis of a ternary-tree according to a ratio of 1:1:2.

In another example, information on a partitioning ratio having a fourth value may indicate that a width or height of a corresponding CU is partitioned on the basis of a binary-tree according to a ratio of 1:3. In other words, information on a partitioning ratio of binary-tree partitioning may be indicated by using information on a partitioning ratio of ternary-tree partitioning.

The information on the partitioning ratio may be a flag or index having a predetermined length (for example, 1-bit), or may be an index having a variable length.

A value of information on a partitioning ratio and a relation with the partitioning ratio in each case are not limited to the above-described examples. When information on a partitioning has a specific value, it may indicate that binary-tree or ternary-tree partitioning is performed in a partitioning ratio of n:m or n:m:r, and a relation of a ratio associated with each value may be variably set. Here, n, m, and r may each be an integer greater than zero.

Partitioning for a case where priorities between quad-tree partitioning and ternary-tree partitioning are not present may be referred to as multi-type tree partitioning. In other words, a CU corresponding to a leaf node of a binary-tree may become a root node of a multi-type tree. Partitioning on a CU corresponding to each node of a multi-type tree may be signaled by using at least one of information on whether or not to perform multi-type tree partitioning, information on a partitioning direction, information on a partitioning ratio, and information on a partitioning tree.

Partitioning for a case where priorities between quad-tree partitioning and binary-tree partitioning are not present may be referred to as multi-type tree partitioning. In other words, a CU corresponding to a leaf node of a binary-tree may become a root node of a multi-type tree. Partitioning on a CU corresponding to each node of a multi-type tree may be signaled by using at least one of information on whether or not to perform multi-type tree partitioning, information on a partitioning direction, information on a partitioning ratio, and information on a partitioning tree.

At least any one of the quad tree partition indication information, the multi-type tree partition indication information, the partition direction information, the partition ratio information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, the partition ratio and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad-tree partition information, binary-tree partition information, ternary-tree partition information, multi-type tree partition indication information, partition direction information, partition ratio information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

In a CU, a CU that is additionally partitioned M times according to quad-tree partitioning, binary-tree partitioning, and/or ternary-tree partitioning may become a unit of encoding, prediction and/or transform. In other words, a CU may be additionally partitioned M times for prediction and/or transform. Herein, a CU that is additionally partitioned M times may be used in a form of the resulting unit when performing encoding/decoding on an image, and the resulting unit may not be partitioned in a block structure. Accordingly, a partitioning structure, partitioning information, etc. for additionally performing partitioning on a CU into a prediction unit and/or a transform unit may not be present in a bitstream. Herein, M may be, for example, 1 or a positive integer.

For example, a CU may be further partitioned M times and N times, respectively so as to perform prediction and/or transform. M and N may be positive integers different from each other.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. At least one of a size of a CU and a size of the largest transform may mean at least one of a width, a height, and an area. Alternatively, at least one of a size of a CU and a size of the largest transform block may mean depth information specifying a size of a CU or block. Alternatively, a size may mean a ratio between a width and a height. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

In addition, when a size of a CU is greater than a size of the largest transform block, a coded block flag (CBF) on a corresponding CU may be determined as a first value according to at least one of a slice type and partitioning information. Herein, the first value may mean 0 indicating that a transform coefficient or quantized level is not present within the corresponding CU. Herein, the slice type may be a P slice or B slice. Herein, partitioning information may mean 0 that is a first value which indicates that a CU is not partitioned.

In an example, when a current slice is a B slice, a size of a CU is 128×128, a size of the largest transform block is 64×64, and partitioning information is 0, a value of a coded block flag of the CU may be determined as 0.

In another example, when a current slice is an I slice, a size of a CU is 128×128, a size of the largest transform block is 64×64, and partitioning information is 0, a value of a coded block flag of the CU may be determined as 0.

In another example, when a current slice is a P slice, a size of a CU is 64×128, a size of the largest transform block is 64×64, and partitioning information is 0, a value of a coded block flag of the CU may be determined as 0.

In another example, when a current slice is a P slice, a size of a CU is 64×32, a size of the largest transform block is 32×16, and partitioning information is 0, a value of a coded block flag of the CU may be determined as 0.

In another example, when a current slice is a B slice, a size of a CU is 128×128, a size of the largest transform block is 32×32, and partitioning information is 0, size/partitioning information on the CU may be additionally entropy encoded/decoded. When the size/partitioning information on the CU is 0 that is a first value, the size of the CU may be determined as 128×128 and a value of a coded block flag of the CU may be determined as 0. In addition, when the size/partitioning information on the CU is 1 that is a second value, a CU having a size of 128×128 is partitioned on the basis of a quad-tree into four CUs of 64×64 sizes, and a value of a coded block flag of the CU may be determined as 0. In other words, when a width or height of a CU is four times larger than a width or height of the largest transform block, size/partitioning information on the CU may be additionally entropy encoded/decoded, and a size of a CU where a value of a coded block flag is 0 may be determined.

In another example, when a current slice is a B slice, a size of a CU is 128×64, a size of the largest transform block is 32×16, and partitioning information is 0, size/partitioning information on the CU may be additionally entropy encoded/decoded. When the size/partitioning information on the CU is 0 that is a first value, the size of the CU may be determined as 128×64 and a value of a coded block flag of the CU may be determined as 0. In addition, when the size/partitioning information on the CU is 1 that is a second value, a CU having a size of 128×64 is partitioned on the basis of a quad-tree into four CUs of 64×32 sizes, and a value of a coded block flag of the CU may be determined as 0.

In addition, when a size of a CU is greater than a size of the largest transform block, a mode of the corresponding CU may be determined as a skip mode according to a slice type or as an AMVP mode where a coded block flag has a first value and a difference value of a motion vector is signaled. Herein, the slice type may be a P slice or B slice.

In an example, when a current slice is a B slice, a size of a CU is 128×128, a size of the largest transform block is 64×64, and partitioning information is 0, a mode of the CU may be determined as a skip mode.

In another example, when a current slice is a P slice, a size of a CU is 64×128, a size of the largest transform block is 64×64, and partitioning information is 0, a mode of the CU may be determined as an AMVP mode where a value of a coded block flag is 0.

In another example, when a current slice is a B slice, a size of a CU is 128×128, a size of the largest transform block is 32×32, and partitioning information is 0, size/partitioning information on the CU may be additionally entropy encoded/decoded. When the size/partitioning information on the CU is 0 that is a first value, the size of the CU may be determined as 128×128 and a mode of the CU may be determined as a skip mode. In addition, when the size/partitioning information on the CU is 1 that is a second value, a CU having a size of 128×128 is partitioned on the basis of a quad-tree into four CUs of 64×64 sizes, and a mode of the CUs may be determined as a skip mode.

In another example, when a current slice is a P slice, a size of a CU is 128×64, a size of the largest transform block is 32×16, and partitioning information is 0, size/partitioning information on the CU may be additionally entropy encoded/decoded. When the size/partitioning information on the CU is 0 that is a first value, the size of the CU may be determined as 128×64 and a mode of the CU may be determined as an AMVP mode where a value of a coded block flag is 0. In addition, when the size/partitioning information on the CU is 1 that is a second value, a CU having a size of 128×64 is partitioned on the basis of a quad-tree into four CUs of 64×32 sizes, and a mode of the CU may be determined as an AMVP mode where a value of a coded block flag is 0.

In the above examples, at least one of a size of a CU and a size of the largest transform block may mean at least one of a width, a height, and an area.

A least one of a size of the CU and a size of the largest transform block may be a value preset in the encoder/decoder, or may be a value signaled from the encoder to the decoder.

In addition, when a depth of a CU is 0, and partitioning information is 0, a value of coded block flag (CBF) of the corresponding CU may be determined as a first value.

In addition, when a depth of a CU is 0 and partitioning information is 0, a mode of the corresponding CU may be determined as a skip mode or as an AMVP mode where a coded block flag has a first value and a difference value of a motion vector is signaled.

In the above examples, a coded block flag may include at least one of a coded block flag of a luma signal and a coded block flag of a chroma signal.

Information of the maximum and/or minimum size of the coding unit and information of the maximum and/or minimum size of the transformation block may be signaled or determined at an upper level of the coding unit. The upper level may be, for example, a sequence level, a sub-picture level, a picture level, a tile level, a tile group level, a slice level, a brick level, or the like. For example, the minimum size of the coding unit may be determined to be 4×4. For example, the maximum size of the transformation block may be determined to be 64×64. For example, the minimum size of the transformation block may be determined to be 4×4. Herein, information on the smallest and/or largest size of a CU, and information on the smallest and/or largest size of a transform block may be signaled for each intra-slice and each inter-slice, or may be determined as a value signaled from an encoder to a decoder regardless of a slice type.

Information on the smallest and/or largest size of a CU may be signaled with respect to a partitioning type of a current block. For example, when a partitioning type of a current CU is one of a quad-tree, a binary-tree, and a ternary-tree, information on the smallest and/or largest size that the CU of the corresponding type possibly possesses may be signaled.

In addition, information on the smallest and/or largest size of a CU of a specific partitioning type may be signaled according to information on the smallest and/or largest size of a general CU.

In addition, information on the smallest and/or largest size of a CU of a specific partitioning type may be signaled according to information on the smallest and/or largest size of a CU of another specific type.

In addition, information on the smallest and/or largest size of a CU of a specific partitioning type may be signaled in a form of a log value. In an example, herein, the exponent of the log may be 2.

In addition, information on the smallest and/or largest size of a CU of each partitioning type may be signaled on the basis of a luma or chroma signal. Hereinafter, a value represented by Y or luma and information represented by C or Chroma may respectively mean information on a luma unit and a chroma unit.

In an example, a difference between the smallest size of a CU after quad-tree partitioning and the smallest size of a general CU may be signaled. For example, a difference between the smallest size of a CU after quad-tree partitioning and the smallest size of a general CU may be signaled through slice_log 2_diff_min_qt_min_cb_luma or slice_log 2_diff_min_qt_min_cb_chroma. The decoder may derive the smallest size (MinQtSizeY or MinQtSizeC) of a CU after quad-tree partitioning by using slice_log 2_diff_min_qt_min_cb_luma or slice_log 2_diff_min_qt_min_cb_chroma, and the smallest size (MinCbLog2SizeY) of a general CU. Hereinafter, when a CU after quad-tree partitioning has the smallest size, it may correspond to a case where the CU after quad-tree partitioning corresponds to a leaf node of the quad-tree partitioning.

In another example, a difference between the largest size of a CU after binary-tree partitioning and the smallest size of a CU after quad-tree partitioning may be signaled. For example, a difference between the largest size of CU after binary-tree partitioning and the smallest size of a CU after quad-tree partitioning may be signaled through slice_log 2_diff_max_bt_min_qt_luma or slice_log 2_diff_max_bt_min_qt_chroma. The decoder may derive the largest size (MaxBtSizeY or MaxBtSizeC) of a CU after binary-tree partitioning by using slice_log 2_diff_max_bt_min_qt_luma or slice_log 2_diff_max_bt_min_qt_chroma, and the smallest size (MinQtLog2Size Y or MinQtLog2SizeC) of a CU after quad-tree partitioning. Meanwhile, the decoder may derive the smallest size (MinBtSizeY or MinBtSizeC) of a CU after binary-tree partitioning by using the smallest size (MinCbLog2SizeY) of a general CU.

In another example, a difference between the largest size of a CU after ternary-tree partitioning and the smallest size of a CU after quad-tree partitioning may be signaled. For example, a difference between the largest size of a CU after ternary-tree partitioning and the smallest size of a CU after quad-tree partitioning may be signaled through slice_log 2_diff_max_tt_min_qt_luma or slice_log 2_diff_max_tt_min_qt_chroma. The decoder may derive the largest size (MaxTtSizeY or MaxTtSizeC) of a CU after ternary-tree partitioning by using slice_log 2_diff_max_tt_min_qt_luma or slice_log 2_diff_max_tt_min_qt_chroma, and the smallest size (MinQtLog2SizeY or MinQtLog2SizeC) of a CU after quad-tree partitioning. Meanwhile, the decoder may derive the smallest size (MinTtSize Y or MinTtSizeC) of a CU after ternary-tree partitioning by using the smallest size (MinCbLog2SizeY) of a general CU.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a sub-picture level, a slice level, a tile group level, a tile level, a brick level or the like. Information of the minimum size of a quad tree and/or information of the maximum depth of a multi-type tree may be signaled for each of an intra-picture slice and an inter-picture slice, or may be determined as a value signaled from an encoder to a decoder regardless of a slice type. Herein, information on the largest depth of a multi-type tree may be signaled or determined in a parent level of the CU by being divided into information on the largest depth of a binary-tree and information on the largest depth of a ternary-tree.

Information on the largest depth of a multi-type tree may be signaled according to information on the smallest size and/or the largest size of a general CU.

In addition, information on the largest depth of a multi-type tree may be signaled in a form of a log value. In an example, herein, the exponent of the log may be 2.

In addition, information on the largest depth of a multi-type tree may be signaled on the basis of a luma or chroma signal. Hereinafter, a value represented by Y or luma and information represented by C or Chroma may respectively mean information on a luma unit and a chroma unit.

For example, information on the largest depth of a multi-type tree may be signaled. For example, information on the largest depth of a multi-type tree may be signaled through slice_max_mtt_hierarchy_depth_luma or slice_max_mtt_hierarchy_depth_chroma. In an example, slice_max_mtt_hierarchy_depth_luma or slice_max_mtt_hierarchy_depth_chroma may have a value from 0 to CtbLog2SizeY-MinCbLog2SizeY. The decoder may derive the largest depth (MaxMttDepthY or MaxMtt-DepthC) of a multi-type tree by using slice_max_mtt_hierarchy_depth_luma or slice_max_mtt_hierarchy_depth_chroma.

Difference information between the size of a CTU and the maximum size of a transformation block may be signaled or determined at an upper level of the coding unit. For example, the upper level may be a sequence level, a picture level, a sub-picture level, a slice level, a tile group level, a tile level, a brick level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. Similarly, the largest size (largest size of a binary-tree) of a CU corresponding to each node of a binary-tree may have a different value according to a slice type. For example, in case of an intra-slice, the largest size of a binary-tree may be 32×32. In addition, for example, in case of an inter-slice, the largest size of a binary-tree may be 128×128. Information on the largest size (largest size of a ternary-tree) of a CU corresponding to each node of a ternary-tree may be determined on the basis of a size of a coding tree unit and the above-described difference information. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

In another example, the largest size of a binary-tree and/or the largest size of a ternary-tree may be signaled or determined in a sequence level, a picture level, a sub-picture level, a slice level, a tile group level, a tile level, a brick level, etc. In addition, the smallest size of a binary-tree and/or the smallest size of a ternary-tree may be signaled or determined in a sequence level, a picture level, a sub-picture level, a slice level, a tile group level, a tile level, a brick level, etc.

In another example, the largest depth of a binary-tree and/or the largest depth of a ternary-tree may be signaled or determined in a sequence level, a picture level, a sub-picture level, a slice level, a tile group level, a tile level, a brick level, etc. In addition, the smallest depth of a binary-tree and/or the smallest depth of a ternary-tree may be signaled or determined in a sequence level, a picture level, a sub-picture level, a slice level, a tile group level, a tile level, a brick level, etc.

Depending on size and depth information of the above-described various blocks, quad-tree partition information, multi-type tree partition indication information, partition tree information, partition ratio level and/or partition direction information may be included or may not be included in a bit stream.

For example, when the size of the coding unit is not larger than the minimum size of a quad tree, the coding unit does not contain quad-tree partition information. Thus, the quad-tree partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

When at least one of a width and a height of the unit or block is not 2 to the n-th power ($2^N$), the corresponding block may be encoded/decoded in a form where a residual signal is not present.

In an example, a coded block flag (CBF) of the unit or block may not be entropy encoded/decoded, or may be estimated (inferred) as 0.

In another example, a skip mode flag for a coding mode of the unit or block may not be entropy encoded/decoded, and estimated as a skip mode.

Accordingly, for a block where at least one of a width and a height is not 2 to the n-th power ($2^N$), transform/inverse-transform may not be performed. In other words, at least one of transform and inverse-transform matrices without a form of 2 to the n-th power may not be necessary.

Figure 4:
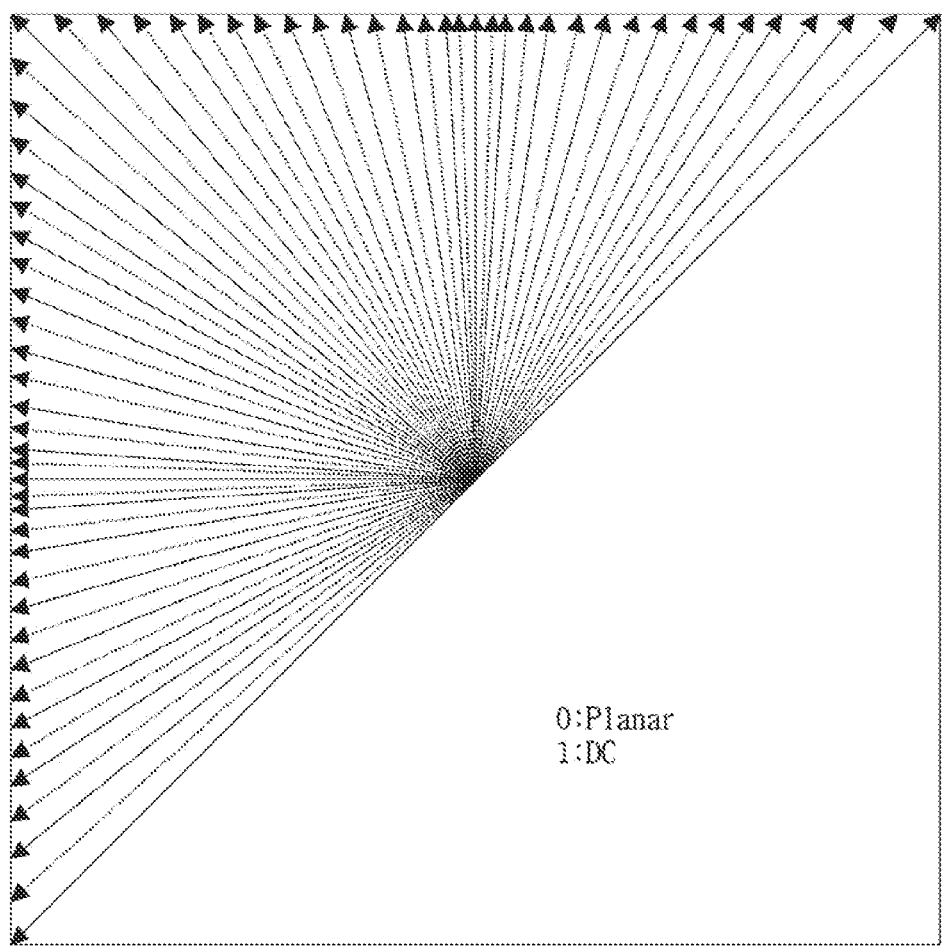
FIG. 4. is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
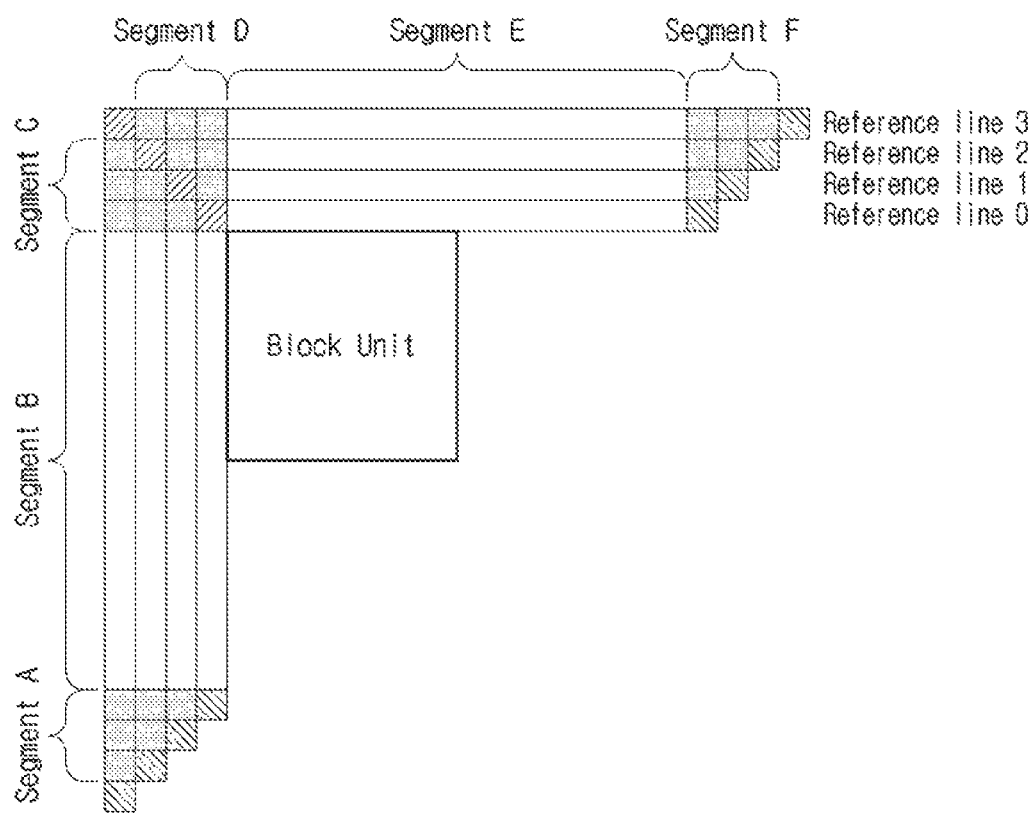
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
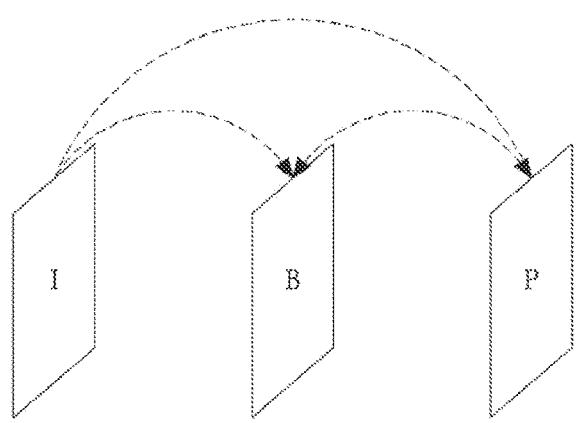
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
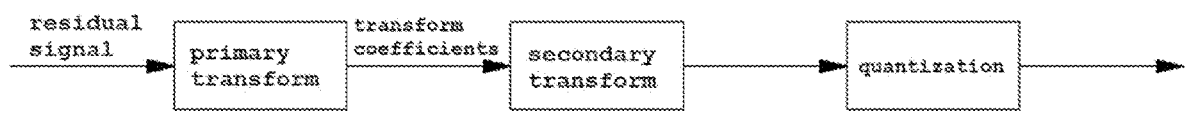
FIG. 6 is a view showing transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
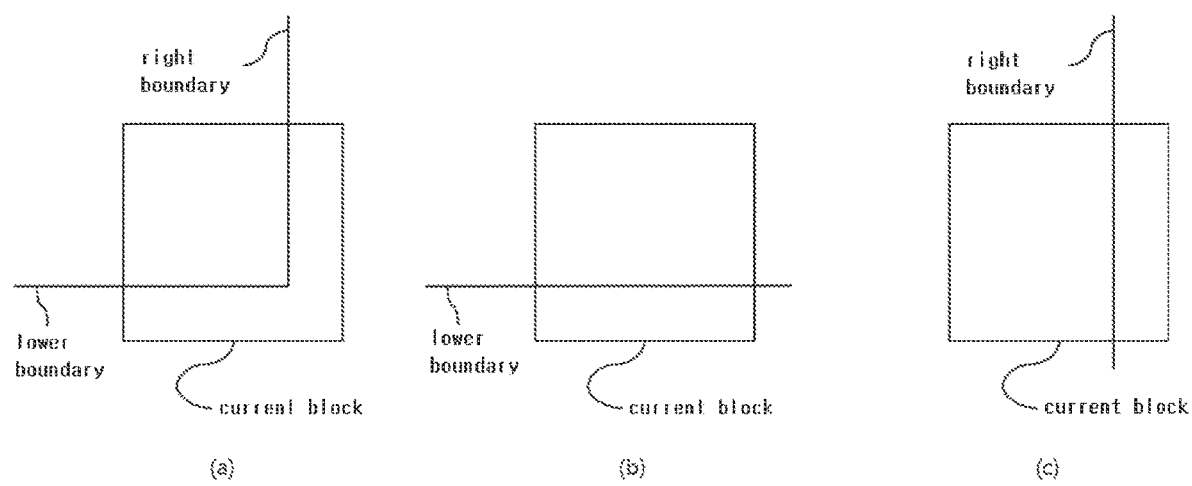
FIG. 8 is a view showing a boundary of a picture/sub-picture/slice/tile/brick, etc. according to an embodiment of the present invention.

FIG. 8 is a view showing a boundary of a picture/sub-picture/slice/tile/brick, etc. according to an embodiment of the present invention.

FIG. 8(a) is a view showing an example where a current block includes both of a right boundary and a lower boundary. FIG. 8(b) is a view showing an example where a current block includes a lower boundary. FIG. 8(c) is a view showing an example where a current block includes a right boundary.

When a current block includes a right boundary, it may mean that a horizontal coordinate of at least one sample included in the current block is greater than a horizontal coordinate of a sample adjacent to and included in a picture/sub-picture/slice/tile/brick, etc.

For example, when a current block includes a right boundary, it may mean that a horizontal coordinate position obtained by adding a width of the current block in a horizontal direction to coordinates (x, y) corresponding to a (0, 0) position (upper-left position of the current block) of the current block is greater than a horizontal coordinate of a boundary of the picture/sub-picture/slice/tile/brick.

In addition, when a current block includes a lower boundary, it may mean that a vertical coordinate of at least one sample included in the current block is greater than a vertical coordinate of a sample adjacent to and included in a picture/sub-picture/slice/tile/brick, etc.

For example, when a current block includes a lower boundary, it may mean that a vertical coordinate position obtained by adding a height of the current block in a vertical direction to coordinates (x, y) corresponding to a (0, 0) position (upper-left position of the current block) of the current block is greater than a vertical coordinate of a boundary of the picture/sub-picture/slice/tile/brick.

Figure 9:
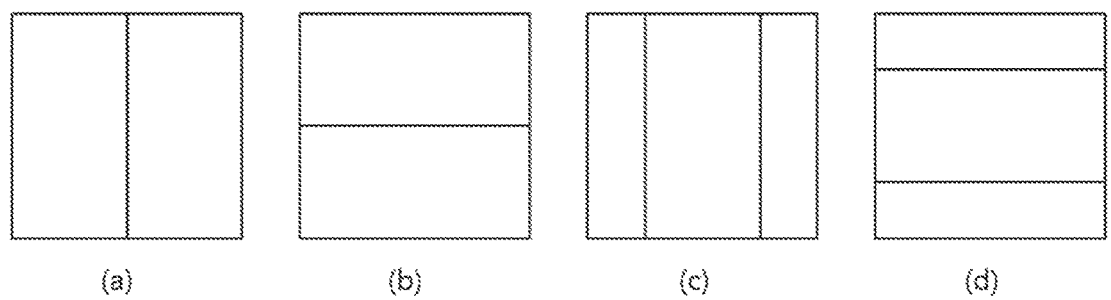
FIG. 9 is a view showing a partitioning method according to an embodiment block of the present invention.

FIG. 9 is a view showing a partitioning method according to an embodiment block of the present invention.

FIG. 9(a) is a view showing an example of vertical binary-tree partitioning. FIG. 9(b) is a view showing an example of horizontal binary-tree partitioning. FIG. 9(c) is a view showing an example of vertical ternary-tree partitioning. FIG. 9(d) is a view showing an example of horizontal ternary-tree partitioning.

When a current block includes a boundary of a picture/sub-picture/slice/tile/brick, etc., partitioning the current block may be implicitly performed. Hereinafter, a boundary may mean at least one boundary of a picture/sub-picture/slice/tile/brick, etc. Herein, each boundary of a picture/sub-picture/slice/tile/brick may mean at least one of a right boundary, a lower boundary, a left boundary, and an upper boundary. Herein, implicitly partitioning may mean a case where a corresponding block is partitioned by using a specific partitioning method without using a coding parameter that is additionally signaled. Alternatively, implicitly partitioning may mean a case where a corresponding block is partitioned by using a specific partitioning method when a predetermined condition is satisfied regardless whether or not a coding parameter that is additionally signaled is present.

At least one of the right boundary and the left boundary may mean a vertical boundary. At least one of the upper boundary and the lower boundary may mean a horizontal boundary.

When the boundary is a vertical boundary or horizontal boundary, vertical partitioning or horizontal partitioning may be available on a current block. In addition, implicitly partitioning on the current block may be performed according to a size of the current block.

In addition, when partitioning the current block, a specific partitioning method may be performed and information on the specific partitioning method may be encoded/decoded. Herein, a specific partitioning method may be determined according to whether a boundary is the vertical boundary or the horizontal boundary, and may be at least one of quad-tree partitioning, vertical binary-tree partitioning, horizontal binary-tree partitioning, vertical ternary-tree partitioning, and horizontal ternary-tree partitioning.

In an example, when a current block includes a vertical boundary, at least one of quad-tree partitioning, vertical binary-tree partitioning, and vertical ternary-tree partitioning may be performed so that a block obtained by partitioning the current block does not exceed the vertical boundary.

In another example, when a current block includes a horizontal boundary, at least one of quad-tree partitioning, horizontal binary-tree partitioning, horizontal ternary-tree partitioning may be performed so that a block obtained by partitioning the current block does not exceed the horizontal boundary.

In another example, when a current block includes a right boundary, partitioning on the current block may be restricted such that only vertical binary-tree partitioning is performed on the current block. Vertical binary-tree partitioning may be implicitly performed on a current block. In addition, information on vertical binary-tree partitioning of a current block may be entropy encoded/decoded. Herein, information on partitioning other than vertical binary-tree partitioning may not be entropy encoded/decoded.

In detail, when a current block includes a right boundary, and a height of the current block exceeds a size of the largest transform block, the current block may be limited such that performing vertical binary-tree partitioning on the current block is not available.

For example, when a current block includes a right boundary, and a height of the current block exceeds 64 that is a size of the largest transform block, the current block may be limited such that performing vertical binary-tree partitioning on the current block is not available.

In addition, when a current block includes a right boundary, but the current block does not include a lower boundary, the current block may be limited such that performing horizontal binary-tree partitioning on the current block is not available.

In another example, when a current block includes a lower boundary, partitioning on the current block may be limited such that only horizontal binary-tree partitioning is performed on the current block. Horizontal binary-tree partitioning may be implicitly performed on a current block. In addition, information on horizontal binary-tree partitioning of a current block may be entropy encoded/decoded. Herein, information on partitioning other than horizontal binary-tree partitioning may not be entropy encoded/decoded.

In detail, when a current block includes a lower boundary, the current block may be limited such that performing vertical binary-tree partitioning on the current block is not available.

In addition, when a current block includes a lower boundary, and a width of the current block exceeds a size of the largest transform block, the current block may be limited such that performing horizontal binary-tree partitioning on the current block is not available.

In another example, when a current block includes a right boundary, partitioning on the current block may be restricted such that only the vertical ternary-tree partitioning is performed on the current block. Vertical ternary-tree partitioning may be implicitly performed on a current block. In addition, information on vertical ternary-tree partitioning for a current block may be entropy encoded/decoded. Herein, information on partitioning other than vertical ternary-tree partitioning may not be entropy encoded/decoded.

In another example, when a current block includes a right boundary, partitioning on the current block may be restricted such that only vertical binary-tree partitioning is performed on the current block. Vertical binary-tree partitioning may be implicitly performed on a current block. In addition, information on vertical binary-tree partitioning of a current block may be entropy encoded/decoded. Herein, information on partitioning other than vertical binary-tree partitioning may not be entropy encoded/decoded.

In another example, when a current block includes a lower boundary, partitioning on the current block may be restricted such that only horizontal binary-tree partitioning is performed on the current block. Horizontal binary-tree partitioning may be implicitly performed on a current block. In addition, information on horizontal binary-tree partitioning for a current block may be entropy encoded/decoded. Herein, information on partitioning other than horizontal binary-tree partitioning may not be entropy encoded/decoded.

In another example, when a current block includes a lower boundary, partitioning on the current block may be restricted such that only horizontal ternary-tree partitioning is performed on the current block. Horizontal ternary-tree partitioning may be implicitly performed on a current block. In addition, information on horizontal ternary-tree partitioning for a current block may be entropy encoded/decoded. Herein, information on partitioning other than horizontal ternary-tree partitioning may not be entropy encoded/decoded.

In another example, when a current block includes at least one of a right boundary and an upper boundary, the current block may be limited such that performing ternary-tree partitioning on the current block is not available.

In another example, when a current block includes both of a right boundary and a lower boundary, partitioning on the current block may be restricted such that only quad-tree partitioning is performed on the current block. Quad-tree partitioning may be implicitly performed on a current block. In addition, information on quad-tree partitioning for a current block may be entropy encoded/decoded. Herein, information on partitioning other than quad-tree partitioning may not be entropy encoded/decoded.

In another example, when a current block includes a right boundary, and a height of the current block is greater than a size of the largest transform block, the current block may be restricted such that performing vertical binary-tree partitioning on the current block is not available. Herein, quad-tree partitioning may be performed on the current block. Quad-tree partitioning on a current block may be implicitly performed without performing entropy encoding/decoding on information on partitioning.

In another example, when a current block includes a lower boundary, and a width of the current block is greater than a size of the largest transform block, the current block may be restricted such that performing horizontal binary-tree partitioning on the current block is not available. Herein, quad-tree partitioning may be performed on the current block. Quad-tree partitioning on a current block may be implicitly performed without performing entropy encoding/decoding on information on partitioning.

In another example, when a current block includes a right boundary, a height of the current block is greater than a size of the largest transform block, and partitioning on the current block is vertical binary-tree partitioning, the current block may be restricted such that performing binary-tree partitioning on the current block is not available. Herein, quad-tree partitioning may be performed on the current block. Quad-tree partitioning on a current block may be implicitly performed without performing entropy encoding/decoding on information on partitioning.

In another example, when a current block includes a lower boundary, a width of the current block is greater than a size of the largest transform block, and partitioning on the current block is horizontal binary-tree partitioning, the current block may be restricted such that performing binary-tree partitioning on the current block is not available. Herein, quad-tree partitioning may be performed on the current block. Quad-tree partitioning on a current block may be implicitly performed without performing entropy encoding/decoding on information on partitioning.

In order to determine a partitioning structure of a current block, syntaxes below may be defined.

In an example, qtbtt_dual_tree_intra_flag may mean that, for an I slice, each CTU is partitioned on the basis of a coding unit of 64×64, and the 64×64 coding unit is used as a root node for a luma component and a chroma component.

For example, when qtbtt_dual_tree_intra_flag has a first value (for example: 0), it may indicate that each CTU may be partitioned on the basis of a coding unit of 64×64, and the 64×64 coding unit is not used as a root node for a luma component and a chroma component, and when qtbtt_dual_tree_intra_flag has a second value (for example: 1), it may indicate that each CTU may be partitioned on the basis of a coding unit of 64×64, and the 64×64 coding unit is used as a root node for a luma component and a chroma component.

When qtbtt_dual_tree_intra_flag has a first value (for example: 0), a partitioning structure of a luma component may be identical to a partitioning structure of a chroma component. However, a block size of a luma component and a block size of a chroma component may be different from each other according to a type of the chroma component. In the above case, it may be referred that a single tree structure is used. A single tree type may be identified as SINGLE_TREE.

When a slice type is an I slice, and qtbtt_dual_tree_intra_flag has a second value (for example: 1) a block partitioning structure of a luma component and a block partitioning structure of a chroma component from an 64×64 coding unit may be different from each other. In the above case, it may be referred that a dual tree structure is used. A tree type of a luma component in a dual tree structure may be identified as DUAL_TREE_LUMA, and a tree type of a chroma component in a dual tree structure may be identified as DUAL_TREE_CHROMA.

In case of a single tree structure, the smallest block for a chroma component may be set as a 2×2 block. Herein, a block that is smaller than 2×2 block may not be used for a chroma component. In other words, from a block equal to or greater than a block size of a 2×2 block, partitioning on the basis of a block size of a 2×2 block may not be available.

In addition, in case of a single tree structure, the smallest block for a chroma component may be set as a 4×4 block. Herein, a 2×2 block, a 2×4 block, and a 4×2 block may not be used for a chroma component. In other words, from a block of a block size equal to or greater than at least one of a 2×2 block, a 2×4 block, and a 4×2 block, partitioning on the basis of at least one of a 2×2 block, a 2×4 block, and a 4×2 block may not be available.

In addition, in case of a dual tree structure, the smallest block for a chroma component may be set as a 4×4 block. Herein, a 2×2 block, a 2×4 block, and a 4×2 block may not be used for a chroma component. In other words, from a block of a block size equal to or greater than at least one of a 2×2 block, a 2×4 block, and a 4×2 block, partitioning on the basis of at least one of a 2×2 block, a 2×4 block, and a 4×2 block may not be available.

When a current block satisfies at least one of conditions below, the current block may be restricted such that performing quad-tree partitioning on the current block is not available.

A case where a tree type to which a current block belongs SINGLE_TREE or DUAL_TREE_LUMA, and a width or height of the current block is equal to or smaller than MinQtSizeY representing the smallest quad-tree size of a luma component.

A case where a tree type to which a current block belongs is DUAL_TREE_CHROMA, and a value obtained by dividing a width or height of the current block by SubWidthC that is a subsampling factor of a chroma signal in a horizontal direction is equal to or smaller than MinQtSizeC representing the smallest quad-tree size of a luma component (Herein, a SubWidthC value that is a subsampling factor of a chroma signal in a horizontal direction may be used as a width of the current block, and a SubHeightC value that is a subsampling factor of a chroma signal in a vertical direction may be used as a height of the current block. In addition, a greater value between a SubWidthC value that is a subsampling factor of a chroma signal in a horizontal direction and a SubHeightC value that is a subsampling factor of a chroma signal in a vertical direction may be used as a width or height of the current block.)

A case where a depth of binary-tree partitioning and ternary-tree partitioning of a current block (depth of multi-type tree) is not 0.

A case where a tree type to which a current block belongs is DUAL_TREE_CHROMA and a value obtained by dividing a width or height of the current block by SubWidthC that is a subsampling factor of a chroma signal in a horizontal direction is equal to or smaller than 4 (Herein, a SubWidthC value that is a subsampling factor of a chroma signal in a horizontal direction may be used for a width of the current block, and a SubHeightC value that is a subsampling factor of a chroma signal in a vertical direction may be used for a height of the current block. In addition, a greater value between a SubWidthC value that is a subsampling factor of a chroma signal in a horizontal direction and a SubHeightC value that is a subsampling factor of a chroma signal in a vertical direction may be used as a width or height of the current block.)

A case where a tree type to which a current block belongs is DUAL_TREE_CHROMA, and a mode type of the current block is at least one of an intra-prediction mode, an intra-block copy (IBC) mode, and a palette coding mode.

Meanwhile, it may be restricted that performing binary-tree partitioning and/or ternary-tree partitioning is not available according to a width and/or a height of a current block (CU).

In an example, when a width and/or a height of a current block is L, it may be restricted that performing ternary-tree partitioning is not available. Herein, the L may be 128.

In another example, when N is smaller than 64 within a current block of an M×N (M is a width, and N is a height)

size, it may be restricted that performing horizontal binary-tree partitioning is not available. Herein, the M may be 128.

In another example, when M is smaller than 64 within a current block of an M×N (M is a width, and N is a height) size, it may be restricted that performing vertical binary-tree partitioning is not available. Herein, the N may be 128.

In another example, when a width of a current block is equal to or smaller than a size of the largest transform block, and a height of the current block is greater than the size of the largest transform block, the current block may be restricted such that performing vertical binary-tree partitioning on the current block is not available. For example, when a width of a current block is equal to or smaller than 64 or 32 that is a size of the largest transform block, and a height of the current block is greater than 64 or 32 that is the size of the largest transform block, the current block may be limited such that performing vertical binary-tree partitioning on the current block is not available.

In another example, when a height of a current block is equal to or smaller than a size of the largest transform block, and a width of the current block is greater than the size of the largest transform block, the current block may be restricted such that performing horizontal binary-tree partitioning on the current block is not available. For example, when a width of a current block is greater than 64 or 32 that is a size of the largest transform block, and a height of the current block is equal to or smaller than 64 or 32 that is the size of the largest transform block, the current block may be limited such that performing horizontal binary-tree partitioning on the current block is not available.

In another example, when a width or height of a current block is equal to or smaller than the smallest binary-tree size of a luma component, the current block may be restricted such that performing binary-tree partitioning on the current block is not available.

In another example, when a width of a current block is greater than a size of the largest binary-tree, the current block may be restricted such that performing binary-tree partitioning on the current block is not available.

In another example, when a height of a current block is greater than a size of the largest binary-tree, the current block may be restricted such that performing binary-tree partitioning on the current block is not available.

In another example, when a depth of binary-tree partitioning and ternary-tree partitioning (depth of multi-type tree) of a current block is equal to or greater than the largest depth of binary-tree partitioning and ternary-tree partitioning (largest depth of multi-type tree), the current block may be restricted such that performing binary-tree partitioning on the current block is not available.

In another example, when a tree type to which a current block belongs is DUAL_TREE_CHROMA, and the product of a value obtained by dividing a width of the current block by a SubWidthC value that is a subsampling factor of a chroma signal in a horizontal direction, and a value obtained by dividing a height of the current block by a SubHeightC value that that is a subsampling factor of a chroma signal in a vertical direction is equal to or smaller than 16, the current block may be limited such that performing binary-tree partitioning on the current block is not available.

In another example, when a tree type to which a current block belongs is DUAL_TREE_CHROMA, and a mode type of the current block is at least one of an intra-prediction mode, an intra-block copy (IBC) mode, and a palette coding mode, the current block may be restricted such that performing binary-tree partitioning on the current block is not available.

In another example, when a width or height of a current block is greater than a size of the largest transform block, the current block may be restricted such that performing ternary-tree partitioning on the current block is not available.

In another example, when a width or height of a current block is greater than a size of the largest transform block and greater than the smallest value of a largest ternary-tree size, the current block may be restricted such that performing ternary-tree partitioning on the current block is not available.

In another example, when a width or height of a current block is equal to or smaller than twice the smallest ternary-tree size, the current block may be restricted such that performing ternary-tree partitioning on the current block is not available.

In another example, when a depth of binary-tree partitioning and ternary-tree partitioning (depth of multi-type tree) of a current block is equal to or greater than the largest depth of binary-tree partitioning and ternary-tree partitioning (largest depth of multi-type tree), the current block may be restricted such that performing ternary-tree partitioning on the current block is not available.

In another example, when a tree type to which a current block belongs is DUAL_TREE_CHROMA, and the product of a value obtained by dividing a width of the current block by a SubWidthC value that is a subsampling factor of a chroma signal in a horizontal direction, and a value obtained by dividing a height of the current block by a SubHeightC value that that is a subsampling factor of a chroma signal in a vertical direction is equal to or smaller than 32, the current block may be restricted such that performing ternary-tree partitioning on the current block is not available.

In another example, when a tree type to which a current block belongs is DUAL_TREE_CHROMA, and a mode type of the current block is at least one of an intra-prediction mode, an intra-block copy (IBC) mode, and a palette coding mode, the current block may be restricted such that performing ternary-tree partitioning on the current block is not available.

Herein, a size of the largest transform block may be 64 or 32, and indicated by a flag signaled from the encoder to the decoder. For example, when the signaled flag has a first value, a size of the largest transform block may be 64. In addition, when the signaled flag has a second value, a size of the largest transform block may be 32.

In another example, the current block may be restricted such that ternary-tree partitioning is allowed in a current block of a 128×128 size, vertical binary-tree partitioning is allowed in a current block of a 128×64 size, and horizontal binary-tree partitioning is allowed in a current block of a 64×128 size. In addition, the current block may be restricted such that ternary-tree partitioning is not allowed in a current block of a 128×64 size and a 64×128 size.

When partitioning a current block, a resulting sub-block may be limited such that a ratio of (width:height) thereof, does not become a specific ratio. In other words, a current block may be limited such that the current block is partitioned into sub-blocks having a ratio equal to or smaller than a specific ratio of (width:height). For example, the ratio of (width:height), may be 1:N, and a ratio of (height:width), may be N:1. Herein, N may be a positive integer of 2, 3, 4, 5, 6, 7, 8, etc. In addition, the N may be determined on the basis of at least one of a coding parameter of a current block and a coding parameter of a candidate. In addition, the N may be a value preset in the encoder/decoder, or may be a value signaled from the encoder to the decoder.

When a ratio of a resulting sub-block obtained by partitioning a current block becomes greater than the above ratio, information partitioning of the resulting sub-block may not be entropy encoded/decoded.

As a first example of partitioning a current block, when a current block includes a boundary of a picture/sub-picture/slice/tile/brick, etc., processes below may be performed.

1) A case where a current block includes both of a right boundary and a lower boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. Binary-tree partitioning may be implicitly performed on a current block.

2) A Case where a Current Block Includes a Lower Boundary 2-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) When a current block is a quad-tree block and a size of the current block is greater than a size of the smallest quad-tree block and equal to or smaller than a size of the largest binary-tree block, partitioning on the current block may be restricted such that only quad-tree partitioning or horizontal binary-tree partitioning is available on the current block. Information on whether or to perform quad-tree partitioning or horizontal binary-tree partitioning on the current block may be entropy encoded/decoded.

2-3) Otherwise (when a current block is a binary-tree block or ternary-tree block or when a size of the current block is smaller than a size of the smallest quad-tree block), partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) When a current block is a quad-tree block and a size of the current block is greater than a size of the smallest quad-tree block and equal to or smaller than a size of the largest binary-tree block, partitioning on the current block may be restricted such that only quad-tree partitioning or vertical binary-tree partitioning is available on the current block. Information on whether or to perform quad-tree partitioning or vertical binary-tree partitioning on the current block may be entropy encoded/decoded.

3-3) Otherwise (when a current block is a binary-tree block or ternary-tree block or when a size of the current block is smaller than a size of the smallest quad-tree block), partitioning on the current block may be restricted such that only vertical binary-tree partitioning is available on the current block. Vertical binary-tree partitioning may be implicitly performed on a current block.

As a second example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. Binary-tree partitioning may be implicitly performed on a current block.

2) A Case where a Current Block Includes a Lower Boundary 2-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) When a current block is a quad-tree block and a size of the current block is greater than a size of the smallest quad-tree block and equal to or smaller than a size of the largest binary-tree block, partitioning on the current block may be restricted such that only quad-tree partitioning or horizontal binary-tree partitioning is available on the current block. Information on whether or to perform quad-tree partitioning or horizontal binary-tree partitioning on the current block may be entropy encoded/decoded.

2-3) Otherwise (when a current block is a binary-tree block or ternary-tree block or when a size of the current block is smaller than a size of the smallest quad-tree block), partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) When a current block is a quad-tree block and a size of the current block is greater than a size of the smallest quad-tree block and equal to or smaller than a size of the largest binary-tree block, partitioning on the current block may be restricted such that only quad-tree partitioning or vertical binary-tree partitioning is available on the current block. Information on whether or to perform quad-tree partitioning or vertical binary-tree partitioning on the current block may be entropy encoded/decoded.

3-3) Otherwise (when a current block is a binary-tree block or ternary-tree block or when a size of the current block is smaller than a size of the smallest quad-tree block), partitioning on the current block may be restricted such that only vertical binary-tree partitioning is available on the current block. Vertical binary-tree partitioning may be implicitly performed on a current block.

As a third example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a size of a current block is greater than a size of the largest quad-tree block, partitioning on the current block may be restricted such that only horizontal binary-tree partitioning is available on the current block. Horizontal binary-tree partitioning may be implicitly performed on a current block. Alternatively partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. Binary-tree partitioning may be implicitly performed on a current block.

1-2) Otherwise, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2) A Case where a Current Block Includes a Lower Boundary 2-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) When a current block is a quad-tree block and a size of the current block is greater than a size of the smallest quad-tree block and equal to or smaller than a size of the largest binary-tree block, partitioning on the current block may be restricted such that only quad-tree partitioning or horizontal binary-tree partitioning is available on the current block. Information on whether or to perform quad-tree partitioning or horizontal binary-tree partitioning on the current block may be entropy encoded/decoded.

2-3) Otherwise (when a current block is a binary-tree block or ternary-tree block or when a size of the current block is smaller than a size of the smallest quad-tree block), partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) When a current block is a quad-tree block and a size of the current block is greater than a size of the smallest quad-tree block and equal to or smaller than a size of the largest binary-tree block, partitioning on the current block may be restricted such that only quad-tree partitioning or vertical binary-tree partitioning is available on the current block. Information on whether or to perform quad-tree partitioning or vertical binary-tree partitioning on the current block may be entropy encoded/decoded.

3-3) Otherwise (when a current block is a binary-tree block or ternary-tree block or when a size of the current block is smaller than a size of the smallest quad-tree block), partitioning on the current block may be restricted such that only vertical binary-tree partitioning is available on the current block. Vertical binary-tree partitioning may be implicitly performed on a current block.

As a fourth example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a size of a current block is greater than a size of a smallest binary-tree block, partitioning on the current block may be restricted such that only horizontal binary-tree partitioning is available on the current block. Horizontal binary-tree partitioning may be implicitly performed on a current block. Alternatively partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. Binary-tree partitioning may be implicitly performed on a current block.

1-2) Otherwise, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2) A Case where a Current Block Includes a Lower Boundary 2-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) When a current block is a quad-tree block and a size of the current block is greater than a size of the smallest quad-tree block and equal to or smaller than a size of the largest binary-tree block, partitioning on the current block may be restricted such that only quad-tree partitioning or horizontal binary-tree partitioning is available on the current block. Information on whether or to perform quad-tree partitioning or horizontal binary-tree partitioning on the current block may be entropy encoded/decoded.

2-3) Otherwise (when a current block is a binary-tree block or ternary-tree block or when a size of the current block is smaller than a size of the smallest quad-tree block), partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) When a current block is a quad-tree block and a size of the current block is greater than a size of the smallest quad-tree block and equal to or smaller than a size of the largest binary-tree block, partitioning on the current block may be restricted such that only quad-tree partitioning or vertical binary-tree partitioning is available on the current block. Information on whether or to perform quad-tree partitioning or vertical binary-tree partitioning on the current block may be entropy encoded/decoded.

3-3) Otherwise (when a current block is a binary-tree block or ternary-tree block or when a size of the current block is smaller than a size of the smallest quad-tree block), partitioning on the current block may be restricted such that only vertical binary-tree partitioning is available on the current block. Vertical binary-tree partitioning may be implicitly performed on a current block.

As a fifth example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) A Case where a Current Block Includes a Lower Boundary 2-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) Otherwise (when a current block is a binary-tree block or ternary-tree block or when a size of the current block is smaller than a size of the smallest quad-tree block), partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) Otherwise (when a current block is a binary-tree block or ternary-tree block or when a size of the current block is equal to or smaller than a size of the smallest quad-tree block), partitioning on the current block may be restricted such that only vertical binary-tree partitioning is available on the current block. Vertical binary-tree partitioning may be implicitly performed on a current block.

As a sixth example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block.

Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) A Case where a Current Block Includes a Lower Boundary 2-1) When a size of a current block is greater than a size of the smallest quad-tree block, it may be restricted that only quad-tree partitioning is available on the current block. Quad-tree partitioning may be implicitly performed on a current block. Accordingly, at least one of binary-tree partitioning and ternary-tree partitioning may not be performed on the current block.

2-2) Otherwise, partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a size of a current block is greater than a size of the smallest quad-tree block partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) Otherwise, partitioning on the current block may be restricted such that only vertical binary-tree partitioning is available on the current block. Vertical binary-tree partitioning may be implicitly performed on a current block.

As a seventh example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) A Case where a Current Block Includes a Lower Boundary 2-1) When a size of a current block is greater than a size of the smallest binary-tree block, partitioning on the current block may be restricted such that only horizontal binary-tree partitioning is available on the current block. Horizontal binary-tree partitioning may be implicitly performed on a current block.

2-2) Otherwise, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3) A Case where a Current Block Includes a Right Boundary 3-1) When a size of a current block is greater than a size of the smallest binary-tree block, partitioning on the current block may be restricted such that only vertical binary-tree partitioning is available on the current block. Vertical binary-tree partitioning may be implicitly performed on a current block.

3-2) Otherwise, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

As an eight example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) A Case where a Current Block Includes a Lower Boundary 2-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) Otherwise (when a current block is a binary-tree block or ternary-tree block or when a size of the current block is equal to or smaller than a size of the smallest quad-tree block or equal to or smaller than a size of the largest binary-tree block, partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a current block is a quad-tree block and a size of the current block is greater than a size of the smallest quad-tree block and greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) Otherwise (when a current block is a binary-tree block or ternary-tree block or when a size of the current block is equal to or smaller than a size of the smallest quad-tree block or equal to or smaller than a size of the largest binary-tree block, partitioning on the current block may be restricted such that only vertical binary-tree partitioning is available on the current block. Vertical binary-tree partitioning may be implicitly performed on a current block.

As a ninth example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) A Case where a Current Block Includes a Lower Boundary 2-1) When a size of a current block is greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2-2) Otherwise, partitioning on the current block may be restricted such that only horizontal binary-tree partitioning is available on the current block. Horizontal binary-tree partitioning may be implicitly performed on a current block.

3) A Case where a Current Block Includes a Right Boundary 3-1) When a size of a current block is greater than a size of the largest binary-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3-2) Otherwise, partitioning on the current block may be restricted such that only vertical binary-tree partitioning is available on the current block. Vertical binary-tree partitioning may be implicitly performed on a current block.

As a tenth example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) A Case where a Current Block Includes a Lower Boundary 2-1) When a size of a current block is greater than a size of the largest quad-tree block, partitioning on the current block may be restricted such that only horizontal binary-tree partitioning is available on the current block. Horizontal binary-tree partitioning may be implicitly performed on a current block.

2-2) Otherwise, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

3) A Case where a Current Block Includes a Right Boundary 3-1) When a size of a current block is greater than a size of the largest quad-tree block, partitioning on the current block may be restricted such that only vertical binary-tree partitioning is available on the current block. Vertical binary-tree partitioning may be implicitly performed on a current block.

3-2) Otherwise, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

As an eleventh example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) A Case where a Current Block Includes Both of a Right Boundary and a Lower Boundary 1-1) When a current block is a quad-tree block and a size of the current block is greater than a size of the smallest quad-tree block, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

1-2) Otherwise, partitioning on the current block may be restricted such that only horizontal binary-tree partitioning is available on the current block. Horizontal binary-tree partitioning may be implicitly performed on a current block. Alternatively, partitioning on the current block may be restricted such that only vertical binary-tree partitioning is available on the current block. Vertical binary-tree partitioning may be implicitly performed on a current block. Accordingly, partitioning on the current block may be restricted such that only binary-tree partitioning is available on the current block. In other words, binary-tree partitioning may be implicitly performed on a current block.

2) When a current block includes a lower boundary, partitioning on the current block may be restricted such that only horizontal binary-tree partitioning is available on the current block. Horizontal binary-tree partitioning may be implicitly performed on a current block.

3) When a current block includes a right boundary, partitioning on the current block may be restricted such that only vertical binary-tree partitioning is available on the current block. Vertical binary-tree partitioning may be implicitly performed on a current block.

As a twelfth example of partitioning a current block, when a current block includes a boundary of a picture/sub-picture/slice/tile/brick, etc., in order to efficiently perform block partitioning in the boundary of the picture/sub-picture/slice/tile/brick, etc., processes below may be performed.

1) When a current block includes both of a right boundary and a lower boundary, partitioning on the current block may be restricted such that only quad-tree partitioning is available on the current block. Quad-tree partitioning may be implicitly performed on a current block. Accordingly, at least one of binary-tree partitioning and ternary-tree partitioning may not be performed on the current block.

2) When a current block includes a lower boundary, partitioning on the current block may be restricted such that only horizontal binary-tree partitioning is available on the current block. Horizontal binary-tree partitioning may be implicitly performed on a current block.

3) When a current block includes a right boundary, partitioning on the current block may be restricted such that only vertical binary-tree partitioning is available on the current. Vertical binary-tree partitioning may be implicitly performed on a current block.

When a current block includes a boundary of a picture/sub-picture/slice/tile/brick, etc., encoding/decoding may not be performed on a region exceeding the boundary of the picture/sub-picture/slice/tile/brick, etc. within the current block, and thus at least one of a width and a height of a region to be encoded/decoded within the current block may not be N squared 2 ($2^N$).

For a case of a current block where at least one of a width and a height of a region to be encoded/decoded is not N squared 2 ($2^N$), encoding/decoding may be performed in a form where a residual signal of the region to be encoded/decoded is not present.

Information on a block where at least one of a width and a height of a region to be encoded/decoded is not N squared 2 ($2^N$) may be entropy encoded/decoded when at least one of when a current block includes at least one of a right boundary and a lower boundary, a current block includes a right boundary, and when a current block includes a lower boundary.

Figure 10:
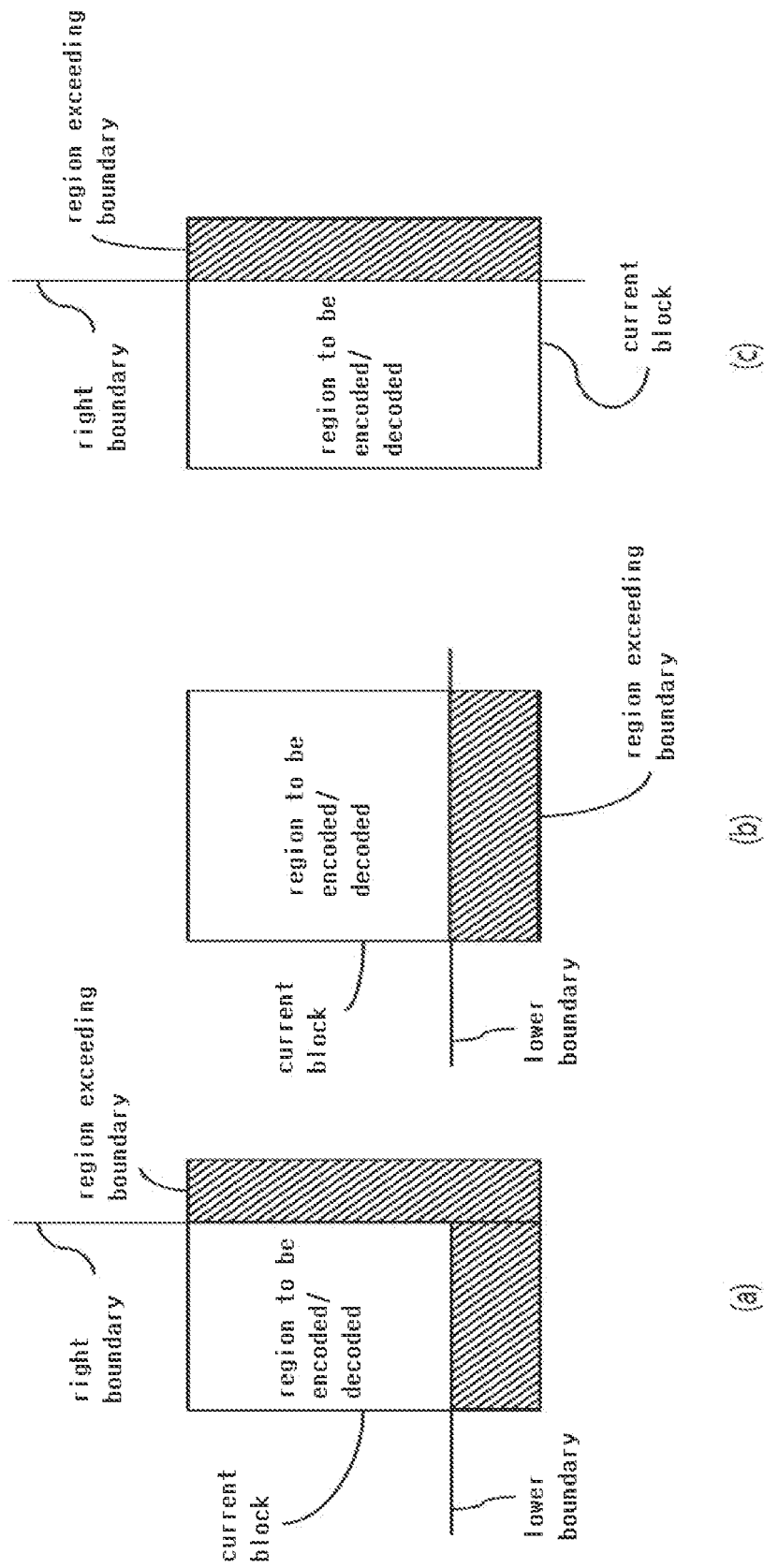
FIG. 10 is a view showing a case where at least one of a width and a height of a region to be encoded/decoded of a current block is not N squared 2 ($2^N$) according to an embodiment of the present invention.

FIG. 10 is a view showing a case where at least one of a width and a height of a region to be encoded/decoded of a current block is not N squared 2 ($2^N$) according to an embodiment of the present invention. FIG. 10(a) is a view showing an example where a current block includes both of a right boundary and a lower boundary. FIG. 10 (b) is a view showing an example where a current block includes a lower boundary. FIG. 10(c) is a view showing an example where a current block includes a right boundary.

For a case of at least one of when a current block includes at least one of a right boundary and a lower boundary, a current block includes a right boundary, and when a current block includes a lower boundary., as shown in FIG. 10, boundary handling information on whether or not to perform encoding/decoding in a form where at least one of a width and a height of a region to be encoded/decoded of a current block is not N squared 2 ($2^N$), or to perform encoding/decoding in at least one of the first to twelfth examples may be encoded/decoded.

In other words, the boundary handling information may be entropy encoded/decoded in a flag form. In addition, the boundary handling information may indicate two cases below.

When boundary handling information has a first value, a form where at least one of a width and a height of a region to be encoded/decoded of a current block is not N squared 2 ($2^N$) is used.

When boundary handling information has a second value, at least one of the first to twelfth examples is used.

When the boundary handling information has a first value, encoding/decoding may be performed on a remaining region excluding the region exceeding the boundary within the current block.

In addition, when the boundary handling information has a second value, a current block may be implicitly partitioned by using at least one of the first to twelfth examples, or encoding/decoding on the current block may be performed by entropy encoding/decoding information on partitioning.

In other words, the boundary handling information may be entropy encoded/decoded in an index form. In addition, the boundary handling information may indicate N cases below. Herein, N may be determined on the basis of at least one coding parameter of a current block. In addition, the N may be a value preset in the encoder/decoder, or may be a value signaled from the encoder to the decoder.

When boundary handling information has a first value, a form where at least one of a width and a height of a region to be encoded/decoded of a current block is not N squared 2 ($2^N$) is used.

When boundary handling information has a second value, at least one of the first to twelfth examples is used.

When boundary handling information has a third value, at least one of the first to the twelfth examples, excluding the example used for a case where the boundary handling information has a second value, is used.

When boundary handling information has an N-th value, at least one of the first to the twelfth examples, excluding the examples used for cases where the boundary handling information has a second value to an N-1th value, is used.

When boundary handling information has an M-th value, an example of combining at least two of the first to twelfth examples is used.

When the boundary handling information has a first value, encoding/decoding may be performed on a remaining region excluding the region exceeding the boundary within the current block.

In addition, when the boundary handling information does not have a first value, a current block may be implicitly partitioned by using at least one of the first to twelfth examples, or encoding/decoding on the current block may be performed by entropy encoding/decoding information on partitioning.

Complexity when performing block partitioning can be reduced by efficiently performing block partitioning in a form of minimizing determinations on various complex conditions by using at least one of the above examples of performing block partitioning on a boundary of the picture/sub-picture/slice/tile/brick, etc.

Meanwhile, a size of the smallest quad-tree block may mean the smallest size of a quad-tree. In addition, a size of the largest quad-tree block may mean the largest size of a quad-tree. Meanwhile, a size of the smallest binary-tree block may mean the smallest size of a binary-tree. In addition, a size of the largest binary-tree block may mean the largest size of a binary-tree.

At least one of the smallest size of a quad-tree block, the largest size of a quad-tree block, the smallest size of a binary-tree block, and the largest size of a binary-tree block may be determined on the basis of at least one coding parameter of a current block. In addition, at least one of the smallest size of a quad-tree block, the largest size of a quad-tree block, the smallest size of a binary-tree block, and the largest size of a binary-tree block may be a value preset in the encoder/decoder, or a value signaled from the encoder to the decoder.

At least one coding parameter of a neighbor block in the block partitioning structure may be used as at least one coding parameter of a current block.

For example, at least one of information on unit partitioning, whether or not to perform partitioning in a quad-tree form, whether or not to perform partitioning in a binary-tree form, a partitioning direction of a binary-tree form (horizontal direction or vertical direction), a partitioning form of a binary-tree form (symmetric partitioning or asymmetric partitioning), a partitioning ratio of a binary-tree form, whether or not to perform partitioning in a ternary-tree form, a partitioning direction of a ternary-tree form (horizontal direction or vertical direction), a partitioning form of a ternary-tree form (symmetric partitioning or asymmetric partitioning), and on a partitioning ratio of a ternary-tree form of a neighbor block may be used as at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of a current block.

At least one coding parameter of a neighbor block in the block partitioning structure may be used for deriving at least one coding parameter of a current block.

For example, at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of a neighbor block may be used for deriving at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of a current block.

Herein, using at least one coding parameter of a neighbor block for deriving at least one coding parameter of a current block may mean that at least one coding parameter of the current block is determined by using at least one coding parameter of the neighbor block.

At least one coding parameter of a neighbor block in the block partitioning structure may be used for deriving at least one coding parameter of another block.

For example, at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of a neighbor block may be used for deriving at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of another block.

Herein, using at least one coding parameter of a neighbor block for deriving at least one coding parameter of another block may mean that at least one coding parameter of the another block is determined by using at least one coding parameter of the neighbor block.

At least one coding parameter of a neighbor block in the block partitioning structure may be used for intra-prediction of a current block.

For example, at least one of an intra-prediction mode, an intra-prediction direction, a reference sample filtering method, a prediction block filtering method, a prediction block filter tap, and a prediction block filtering coefficient of a neighbor block may be used for intra-prediction of a current block.

At least one coding parameter of a neighbor block in the block partitioning structure may be used for inter-prediction or motion compensation of a current block.

For example, at least one of an inter-prediction mode, motion information, a motion vector, a reference image index, an inter-prediction direction, an inter-prediction indicator, a reference image list, a motion vector predictor, a motion vector candidate list, whether or not to use a merge mode, a merge candidate, a merge candidate list, whether or not to use a skip mode, an interpolation filter type, an interpolation filter tap, an interpolation filter coefficient, a size of a motion vector and accuracy of motion vector representation of a neighbor block may be used for inter-prediction or motion compensation of a current block.

At least one coding parameter of a neighbor block in the block partitioning structure may be used for transform, inverse-transform, quantization or dequantization of a current block. Herein, transform and inverse-transform may include at least one of primary transform, secondary transform, primary inverse-transform, and secondary inverse-transform.

For example, at least one of a transform type, a transform size, information on whether or not to use primary transform, information on whether or not to use secondary transform, a primary transform index, a secondary transform index, information on whether or not a residual signal is present, a coding block pattern, a coding block flag, a quantization parameter, a quantization matrix of a neighbor block may be used for transform, inverse-transform, quantization, or dequantization of a current block.

At least one coding parameter of a neighbor block in the block partitioning structure may be used for entropy encoding/decoding of a current block.

For example, at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of a neighbor block may be used for entropy encoding/decoding at least one of information on unit partitioning, whether or not to perform partitioning in a quad-tree form, whether or not to perform partitioning in a binary-tree form, a partitioning direction of a binary-tree form, a partitioning form of a binary-tree form, a partitioning ratio of a binary-tree form, whether or not to perform partitioning in a ternary-tree form, a partitioning direction of a ternary-tree form, a partitioning form of a ternary-tree form, and on a partitioning ratio of a ternary-tree form of a current block. Herein, entropy encoding/decoding may include determining a binarization/debinarization method, determining a context model, updating a context model, performing a regular mode, performing a bypass mode, etc.

At least one coding parameter of a neighbor block in the block partitioning structure may be used for a method of performing filtering such as intra-loop filter, deblocking filter, adaptive sample offset, adaptive in-loop filter, etc. on a current block.

For example, at least one of whether or not to apply an intra-loop filter, an intra-loop filter coefficient, an intra-loop filter tap, an intra-loop filter shape, an intra-loop filter form, whether or not to apply deblocking filter, a deblocking filter coefficient, a deblocking filter tap, a deblocking filter strength, a deblocking filter shape, a deblocking filter form, whether or not to apply adaptive sample offset, an adaptive sample offset value, an adaptive sample offset category, adaptive sample offset type, whether or not to apply adaptive in-loop filter, an adaptive in-loop filter coefficient, an adaptive in-loop filter tap, an adaptive in-loop filter shape and an adaptive in-loop filter form of a neighbor block may be used for a method of performing filtering such as deblocking filter, adaptive sample offset, adaptive in-loop filter, etc. on a current block.

At least one coding parameter of a neighbor block in the block partitioning structure may be used for intra-prediction, inter-prediction or motion compensation, entropy encoding/decoding, and a filtering method such as intra-loop filter, deblocking filter, adaptive sample offset, adaptive in-loop filter, etc. of another neighbor block.

At least one coding parameter of a luma signal block in the block partitioning structure may be used as at least one coding parameter of a chroma signal block. In addition, at least one coding parameter of a luma signal block in the block partitioning structure may be used for deriving at least one coding parameter of a chroma signal block. In addition, at least one coding parameter of a luma signal block in the block partitioning structure may be used for at least one of intra-prediction, inter-prediction, motion compensation, transform, inverse-transform, quantization, dequantization, entropy encoding/decoding, intra-loop filter, deblocking filter, adaptive sample offset, adaptive in-loop filter of a chroma signal block.

At least one coding parameter of a Cb/Cr signal block in the block partitioning structure may be used as at least one coding parameter of a Cb/Cr signal block. In addition, at least one coding parameter of a Cb/Cr signal block in the block partitioning structure may be used for deriving at least one coding parameter of a Cb/Cr block signal. In addition, at least one coding parameter of a Cb/Cr signal block in the block partitioning structure may be used for at least one of intra-prediction, inter-prediction, motion compensation, transform, inverse-transform, quantization, dequantization, entropy encoding/decoding, intra-loop filter, deblocking filter, adaptive sample offset, adaptive in-loop filter of a Cr/Cb signal block.

At least one coding parameter and information described below may be entropy encoded/decoded for each resulting block obtained by using the above block partitioning structure. In addition, a method indicated by the following information may be performed on the basis of at least one of a block size and a block shape of at least one piece of the entropy encoded/decoded information.

Motion information may include at least one of a motion vector, a reference image index, an inter-prediction indicator, information on whether or not to use a skip mode (skip_flag), information on whether or not to use a merge mode (merge_flag), merge index information (merge_index), information on a motion vector resolution, information on overlapped block motion compensation, information on local illumination compensation, information on affine motion compensation, information on decoder-side motion vector derivation, and information on bi-directional optical flow.

Information on a motion vector resolution may be information representing whether or not at least one of a motion vector and a difference between motion vectors uses a specific resolution. Herein, a resolution may mean precision. In addition, a specific resolution may be set in at least one of an integer pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) unit.

Information on overlapped block motion compensation may represent whether or not a motion vector of a neighbor block spatially adjacent to a current block is additionally used so as to calculate a weighted sum of a prediction block of the current block when performing motion compensation on the current block.

Information on local illumination compensation may be information representing whether or not at least one of a weighting factor and an offset value is applied when generating a prediction block of a current block. Herein, a weighting factor and an offset value may be values calculated on the basis of a reference block.

Information on affine motion compensation may be information representing whether or not an affine motion model is used when performing motion compensation on a current block. Herein, an affine motion model may be a model calculated by partitioning one block into sub-blocks by using a plurality of parameters, and calculating motion vectors of the sub-blocks by using representative motion vectors.

Information on decoder-side motion vector derivation may be information representing whether or not a motion vector required for motion compensation is derived and used in the decoder. Information on a motion vector may not be entropy encoded/decoded on the basis of information on decoder-side motion vector derivation. In addition, when information on decoder-side motion vector derivation indicates that a motion vector is derived and used in the decoder, information on a merge mode may be entropy encoded/decoded. In other words, information on decoder-side motion vector derivation may represent whether or not a merge mode is used in the decoder.

Information on bi-directional optical flow may be information representing whether or not motion compensation is performed by correcting a motion vector on the basis of a pixel or sub-block. A motion vector based on a pixel or sub-block may not be entropy encoded/decoded on the basis of information on bi-directional optical flow. Herein, correcting a motion vector may be replacing a motion vector based on a block with a motion vector value based on a pixel or sub-block.

Figure 11:
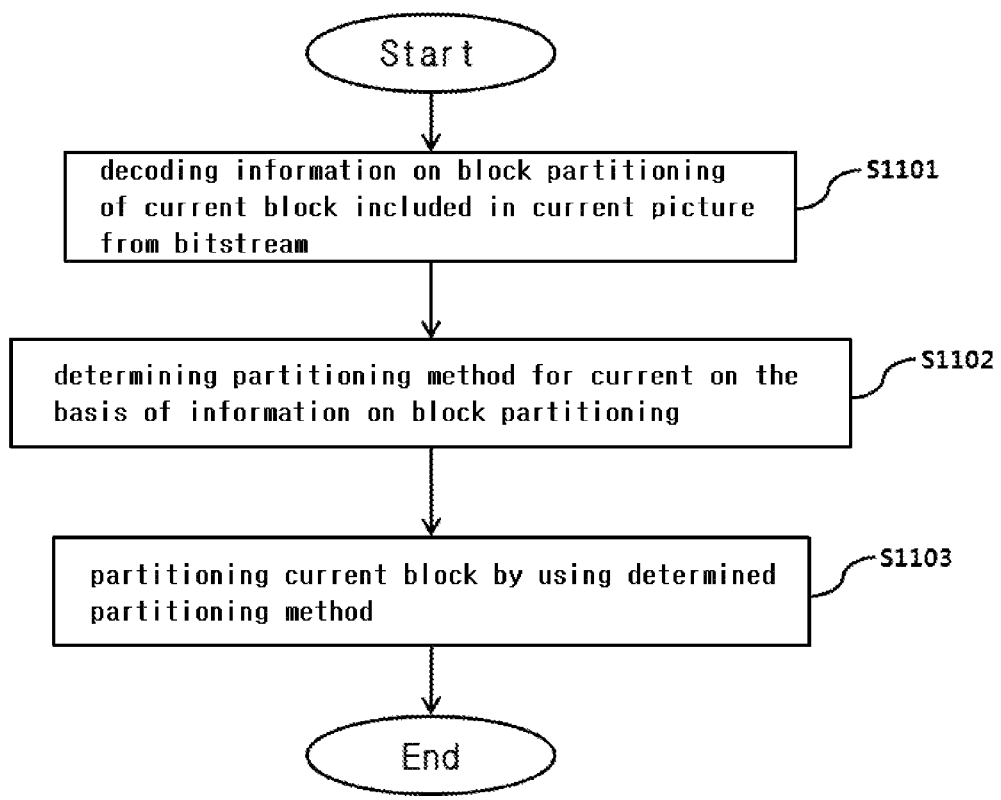
FIG. 11 is a view of a flowchart showing a method of decoding an image according to an embodiment of the present invention.

FIG. 11 is a view of a flowchart showing a method of decoding an image according to an embodiment of the present invention.

In S1101, information on block partitioning of a current block included in a current picture may be decoded from a bitstream.

Herein, the information on block partitioning may include at least one of information on a current block size, information on a current block depth, and information on whether or not to perform partitioning.

In S1102, a partitioning method for the current block may be determined on the basis of the information on block partitioning.

Herein, the partitioning method may include at least one of quad-tree partitioning, horizontal binary-tree partitioning, vertical binary-tree partitioning, horizontal ternary-tree partitioning, and vertical ternary-tree partitioning.

In S1103, the current block may be partitioned by using the determined partitioning method.

Herein, the partitioning method may be determined on the basis of whether or not the current block includes a predetermined boundary.

Herein, the predetermined boundary may include at least one of a right boundary, a lower boundary, a left boundary, and an upper boundary of a picture, a sub-picture, a slice, a tile, and a brick to which the current block belongs.

Meanwhile, when the current block includes a right boundary and a lower boundary of the current picture, and a width of the current block is greater than a size of the smallest quad-tree block, the partitioning method may be determined as quad-tree partitioning.

In addition, when the current block includes a right boundary of the current picture, and a height of the current block is greater than a size of the largest transform block, the partitioning method may be determined as partitioning other than vertical binary-tree partitioning.

In addition, when the current block includes a lower boundary of the current picture, and a width of the current block is greater than a size of the largest transform block, the partitioning method may be determined as partitioning other than horizontal binary-tree partitioning.

In addition, when a width of a current block is equal to or smaller than a size of the largest transform block, and a height of the current block is greater than the size of the largest transform block, the partitioning method may be determined as partitioning other than vertical binary-tree partitioning.

In addition, when a height of the current block is equal to or smaller than a size of the largest transform block, and a width of the current block is greater than the size of the largest transform block, the partitioning method may be determined as partitioning other than horizontal binary-tree partitioning.

Herein, a size of the largest transform block may be a value signaled from the encoder to the decoder.

Figure 12:
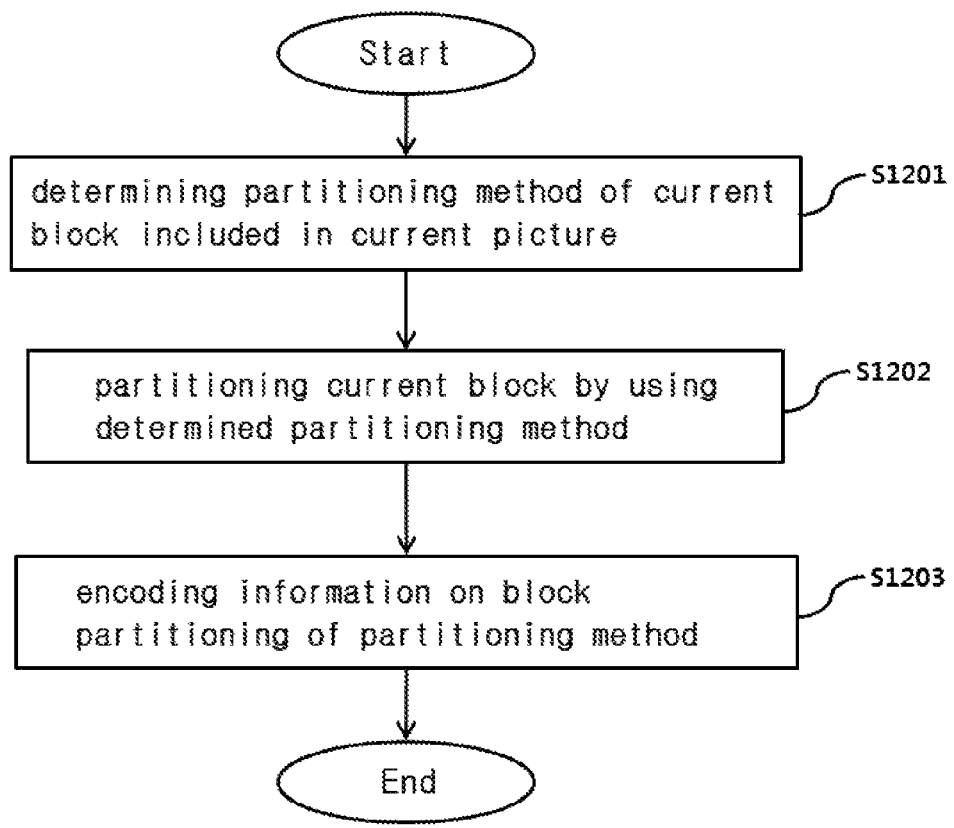
FIG. 12 is a view of a flowchart of an image encoding method an according to an embodiment of the present invention.

FIG. 12 is a view of a flowchart of an image encoding method an according to an embodiment of the present invention.

In S1201, a partitioning method of a current block included in a current picture may be determined.

In S1202, the current block may be partitioned by using the determined partitioning method.

Herein, the partitioning method may include at least one of quad-tree partitioning, horizontal binary-tree partitioning, vertical binary-tree partitioning, horizontal ternary-tree partitioning, and vertical ternary-tree partitioning.

Herein, the partitioning method may be determined on the basis of whether or not the current block includes a predetermined boundary.

Herein, the predetermined boundary may include at least one of a right boundary, a lower boundary, a left boundary, and an upper boundary of a picture, a sub-picture, a slice, a tile, and a brick to which the current block belongs.

Meanwhile, when the current block includes a right boundary and a lower boundary of the current picture, and a width of the current block is greater than a size of the smallest quad-tree block, the partitioning method may be determined as quad-tree partitioning.

In addition, when the current block includes a right boundary of the current picture, and a height of the current block is greater than a size of the largest transform block, the partitioning method may be determined as partitioning other than vertical binary-tree partitioning.

In addition, when the current block includes a lower boundary of the current picture, and a width of the current block is greater than a size of the largest transform block, the partitioning method may be determined as partitioning other than horizontal binary-tree partitioning.

In addition, when a width of a current block is equal to or smaller than a size of a largest transform block, and a height of the current block is greater than the size of the largest transform block, the partitioning method may be determined as partitioning other than vertical binary-tree partitioning.

In addition, when a height of the current block is equal to or smaller than a size of the largest transform block, and a width of the current block is greater than the size of the largest transform block, the partitioning method may be determined as partitioning other than horizontal binary-tree partitioning.

Herein, a size of the largest transform block may be a value signaled from the encoder to the decoder.

In S1203, information on block partitioning of the above partitioning method may be encoded.

Herein, the information on block partitioning may include at least one of information on a current block size, information on a current block depth, and information on whether or not to perform partitioning.

When partitioning an image on the basis of at least one of a prediction unit (PU), a transform unit (TU), a prediction block (PB), and a transform block (TB), at least one of the above examples of the coding unit may be used.

The above examples of the present invention maybe applied according to at least one size of a coding block, a prediction block, block, and a unit. Herein, a size may be defined as the smallest and/or largest size so that the above examples are applied, or defined as a fixed size where the above example is applied. In addition, the first example may be applied to a first size and the second example may be applied to a second size among the above examples. In other words, the above examples may be combined according to a size. In addition, the above examples of the present invention may be applied when a size is equal to or greater than the smallest size and equal to or smaller than the largest size. In other words, the above examples may be applied when a block size is included in a certain range.

In addition, the above examples of the present invention may be applied when a size is equal to or greater than the smallest size and equal to or smaller than the largest size. Herein, the smallest size and the largest size may respectively be one size of a coding block, a prediction block, a block, and a unit. In other words, a block of the smallest size and a block of the largest size may be different from each other. For example, the above examples of the present invention may be applied when a size of a current block is equal to or greater than the smallest size of a prediction block and equal to or smaller than the largest size of a coding block.

For example, the above examples of the present invention may be applied when a size of a current block is equal to or greater than 8×8. For example, the above examples of the present invention may be applied when a size of a current block is equal to or greater than 16×16. For example, the above examples of the present invention may be applied when a size of a current block is equal to or greater than 32×32. For example, the above examples of the present invention may be applied when a size of a current block is equal to or greater than 64×64. For example, the above examples of the present invention may be applied when a size of a current block is equal to or greater than 128×128. For example, the above examples of the present invention may be applied when a size of a current block is 4×4. For example, the above examples of the present invention may be applied when a size of a current block is equal to or smaller than 8×8. For example, the above examples of the present invention may be applied when a size of a current block is equal to or smaller than 16×16. For example, the above examples of the present invention may be applied when a size of a current block is equal to or greater than 8×8 and equal to or smaller than 16×16. For example, the above examples of the present invention may be applied when a size of a current block is equal to or greater than 16×16 and equal to or smaller than 64×64.

The above examples of the present invention may be applied according to a temporal layer. An additional identifier for identifying a temporal layer to which the above examples are possibly applied may be signaled, and the above examples may be applied to a temporal layer specified by the corresponding identifier. Herein, the identifier may be defined as the smallest layer and/or the largest layer to which the above examples are possibly applied, or defined as indicating a specific temporal layer to which the above example is possibly applied.

For example, only when a temporal layer of the current picture is the lowest layer, the above examples may be applied. For example, only when an identifier of a temporal layer of the current picture is zero, the above examples may be applied. For example, only when an identifier of a temporal layer of the current picture is 1, the above examples may be applied. For example, only when the temporal layer of the current picture is the highest layer, the above examples may be applied.

As described in the above examples of the present invention, a reference picture set used when generating a reference picture list (reference picture list construction), and modifying a reference picture list may use at least one of reference picture lists L0, L1, L2, and L3.

According to the above examples of the present invention, when calculating boundary strength in deblocking filter, at least one to at most N motion vectors of a current bloc may be used. Herein, N may represent a positive integer equal to or greater than 1 such as 2, 3, 4, etc.

The above examples of the present invention may be applied when a motion vector has at least one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) unit. In addition, a motion vector may be selectively used for each pixel unit when encoding/decoding a current block.

A slice type to which the above examples of the present invention are possibly applied may be defined, and the above examples of the present invention may be applied according to the slice type.

A block shape to which the above examples of the present invention are possibly applied may be a square or non-square.

The above examples may be performed in the same way in the encoder and the decoder.

An image may be encoded/decoded by using at least one or by combining at least two of the above examples.

An order of applying the above example may be different in the encoder and in the decoder, or an order of applying the example may be the same in the encoder and in the decoder.

The above example may be performed for each of luma and chroma signals, or the above example may be performed in the same way for luma and chroma signals.

A least one of syntax elements such as the flag, the index, etc. which is entropy encoded in the encoder and entropy decoded in the decoder may use at least one of below binarization, debinarization, and entropy encoding/decoding methods. Herein, binarization, debinarization, and entropy encoding/decoding methods may include at least one of a binarization/debinarization method (se (v)) of a 0-th order exp_Golomb with a sign, a binarization/debinarization method (sek (v)) of a k-th order exp_Golomb with a sign, a binarization/debinarization method (ue (v)) of a 0-th order exp_Golomb for a positive integer without a sign, a binarization/debinarization method (uek (v)) of a k-th order exp_Golomb for a positive integer without a sign, a fixed-length binarization/debinarization method (f(n)), a truncated Rice binarization/debinarization method or truncated unary binarization/debinarization method (tu(v)), a truncated binary binarization/debinarization method (tb(v)), a context-based adaptive arithmetic encoding/decoding method (ae (v)), a byte-by-byte bitstring (b(8)), an integer binarization/ debinarization method (i(n)) with a sign, an integer binarization/debinarization method (u(n)) without a sign, and a unary binarization/debinarization method.

Encoding/decoding on a current block is not limited to any one of the above examples, and a specific example or a combination thereof of the above examples may be applied to encoding/decoding of the current block.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
    decoding information on block partitioning of a current block included in a current picture from a bitstream;
    determining a partitioning method of the current block on the basis of the information; and
    partitioning the current block by using the determined partitioning method,
    wherein the partitioning method is determined on the basis of whether or not the current block includes a predetermined boundary, and
    wherein when the current block includes a right boundary and a bottom boundary of the current picture and a width of the current block is greater than a size of a smallest quadtree block, the partitioning method is determined as quad-tree partitioning.

2. The method of claim 1, wherein the information on block partitioning includes at least one of information on a size of the current block, information on a depth of the current block, or information on whether or not to perform partitioning.

3. The method of claim 1, wherein the partitioning method includes at least one of quad-tree partitioning, horizontal binary-tree partitioning, vertical binary-tree partitioning, horizontal ternary-tree partitioning, or vertical ternary-tree partitioning.

4. The method of claim 1, wherein the predetermined boundary includes at least one of a right boundary, a bottom boundary, a left boundary, or a top boundary of at least one of a picture, a sub-picture, a slice, a tile, or a brick to which the current block belongs.

5. A method of encoding an image, the method comprising:
    determining a partitioning method of a current block included in a current picture;
    partitioning the current block by using the determined partitioning method; and
    encoding information on block partitioning of the partitioning method,
    wherein the partitioning method is determined on the basis of whether or not the current block includes a predetermined boundary, and
    wherein when the current block includes a right boundary and a bottom boundary of the current picture and a width of the current block is greater than a size of a smallest quadtree block, the partitioning method is determined as quad-tree partitioning.

6. The method of claim 5, wherein the information on block partitioning includes at least one of information on a size of the current block, information on a depth of the current block, or information on whether or not to perform partitioning.

7. The method of claim 5, wherein the partitioning method includes at least one of quad-tree partitioning, horizontal binary-tree partitioning, vertical binary-tree partitioning, horizontal ternary-tree partitioning, or vertical ternary-tree partitioning.

8. The method of claim 5, wherein the predetermined boundary includes at least one of a right boundary, a bottom boundary, a left boundary, or a top boundary of at least one of a picture, a sub-picture, a slice, a tile, or a brick to which the current block belongs.

9. A non-transitory computer-readable medium storing a bitstream generated by an encoding method, the method comprising:
- determining a partitioning method of a current block included in a current picture;
- partitioning the current block by using the determined partitioning method; and
- encoding information on block partitioning of the partitioning method,
- wherein the partitioning method is determined on the basis of whether or not the current block includes a predetermined boundary, and
- wherein when the current block includes a right boundary and a bottom boundary of the current picture and a width of the current block is greater than a size of a smallest quadtree block, the partitioning method is determined as quad-tree partitioning.

10. The non-transitory computer-readable medium of claim 9, wherein the information on block partitioning includes at least one of information on a size of the current block, information on a depth of the current block, or information on whether or not to perform partitioning.

11. The non-transitory computer-readable medium of claim 9, wherein the partitioning method includes at least one of quad-tree partitioning, horizontal binary-tree partitioning, vertical binary-tree partitioning, horizontal ternary-tree partitioning, or vertical ternary-tree partitioning.

12. The non-transitory computer-readable medium of claim 9, wherein the predetermined boundary includes at least one of a right boundary, a bottom boundary, a left boundary, or a top boundary of at least one of a picture, a sub-picture, a slice, a tile, or a brick to which the current block belongs.

* * * * *